United States Patent
Natarajan et al.

(10) Patent No.: US 11,061,873 B2
(45) Date of Patent: Jul. 13, 2021

(54) SYSTEMS AND METHODS FOR ELECTRONIC SEARCHING OF MATERIALS AND MATERIAL PROPERTIES

(71) Applicant: Elsevier, Inc., New York, NY (US)

(72) Inventors: Venkatesh Natarajan, New York, NY (US); Yusufee Nathani, Gujarat (IN); Avin Sijariya, Jhansi (IN); Chi Yeung Cheung, North Bergen, NJ (US)

(73) Assignee: ELSEVIER, INC., New York, NY (US)

( * ) Notice: Subject to any disclaimer, the term of this patent is extended or adjusted under 35 U.S.C. 154(b) by 750 days.

(21) Appl. No.: 15/623,920

(22) Filed: Jun. 15, 2017

(65) Prior Publication Data

US 2017/0286457 A1    Oct. 5, 2017

Related U.S. Application Data

(63) Continuation of application No. PCT/US2017/022941, filed on Mar. 17, 2017.
(Continued)

(51) Int. Cl.
*G06F 16/00* (2019.01)
*G06F 16/21* (2019.01)
(Continued)

(52) U.S. Cl.
CPC .......... *G06F 16/212* (2019.01); *G06F 16/248* (2019.01); *G06F 16/2453* (2019.01); *G06F 16/2455* (2019.01); *G06F 16/258* (2019.01)

(58) Field of Classification Search
CPC ............. G06F 16/212; G06F 16/2453; G06F 16/2455; G06F 16/258; G06F 16/248
See application file for complete search history.

(56) References Cited

U.S. PATENT DOCUMENTS

| 5,408,638 A | 4/1995 | Sagawa et al. |
| 7,188,055 B2 | 3/2007 | Agrafiotis et al. |

(Continued)

FOREIGN PATENT DOCUMENTS

| EP | 1283479 | 2/2003 | |
| WO | WO-0020991 A1 * | 4/2000 | ............. G16C 20/60 |

(Continued)

OTHER PUBLICATIONS

Notification of Transmittal of the International Search Report and the Written Opinion of PCT/US17/22941, dated Jul. 13, 2017.
(Continued)

*Primary Examiner* — Anhtai V Tran
(74) *Attorney, Agent, or Firm* — Dinsmore & Shohl LLP

(57) ABSTRACT

Systems and methods for normalizing and searching electronic data, such as chemical material property data, are disclosed. In one embodiment, a method includes receiving electronic data from a source. The electronic data is formatted in a source format. The method further includes converting the source data into a normalized format, and storing normalized electronic data in levels of a nested model. The method further includes receiving a search or browse query directed toward normalized properties in a first level of the nested model or a second level of the nested model, in any non-hierarchical order. The method also includes searching the nested model and causing for display on an electronic display one or more entities satisfying the query and maintaining the integrity of all parameters of the query across all selected properties queried in any non-hierarchical order.

17 Claims, 28 Drawing Sheets

Related U.S. Application Data

(60) Provisional application No. 62/309,701, filed on Mar. 17, 2016.

(51) Int. Cl.
  *G06F 16/248* (2019.01)
  *G06F 16/25* (2019.01)
  *G06F 16/2455* (2019.01)
  *G06F 16/2453* (2019.01)

(56) References Cited

U.S. PATENT DOCUMENTS

| | | |
|---|---|---|
| 7,933,763 B2 | 4/2011 | Lawson et al. |
| 8,467,974 B2 | 6/2013 | Kaushikkar et al. |
| 2002/0184236 A1 | 12/2002 | Donath et al. |
| 2007/0024622 A1* | 2/2007 | Brauss ................ G06T 11/206 345/440 |
| 2011/0161384 A1 | 6/2011 | Wykes et al. |
| 2011/0199380 A1* | 8/2011 | Budiu ................ G06T 11/206 345/440 |
| 2013/0191093 A1 | 7/2013 | Leitch et al. |
| 2015/0120363 A1 | 4/2015 | Yoshinaga et al. |
| 2015/0278902 A1 | 10/2015 | Warren et al. |
| 2016/0092041 A1* | 3/2016 | Pickens ................ H04N 1/6011 715/771 |
| 2016/0147912 A1* | 5/2016 | Bergin ............... G05B 19/4097 703/1 |

FOREIGN PATENT DOCUMENTS

| | | |
|---|---|---|
| WO | 2001008032 | 2/2001 |
| WO | 2001059613 | 8/2001 |
| WO | 2014087424 | 6/2014 |

OTHER PUBLICATIONS

D. W. Fellner et al., Visual search and analysis in complex information spaces, https://bib.dbvis.de/uploadedFiles/expandingVAchapter12.pdf, Feb. 16, 2017.

* cited by examiner

FIG. 9A

☆ SAVE MATERIAL

150 →
- CAS RN: 64-17-5
- MATERIAL OR SUBSTANCE NAME: ETHANOL
- MAOLECULAR FORMULA: C2H6O
- SMILES: CCO
- INCHI: INCHI=1S/C2H6O/C1-2-3/H3H2H2,1H3
- INCHIKEY: LFQSCWFLJHTTHZ-UHFFFAOYSA-N
- MOLFILE: ↘ DOWNLOAD
- SYNONYMS: (E15I0)(SD ALCOHOL 23-HYDROGEN)(ABSOLUTE ALCOHOL)(ABSOLUTE ETHANOL) ← 152
  EXPAND ALL SYNONYMS

151 → [structure image: OH]

100 →

TAXONOMY

| CLASSIFICATION NO. | SECTION | CLASS | SUB-CLASS | GROUP |
|---|---|---|---|---|
| 1 | ORGANIC COMPOUNDS | ALCOHOLS | ALIPHATIC ALCOHOLS | PRIMARY |

SINGLE-VALUED PROPERTIES

↘ DOWNLOAD

| PROPERTY | SOURCE | PHASE | VALUE | UNCERTAINTY | EXP. DATE | CONDS |
|---|---|---|---|---|---|---|
| BOILING POINT | NIST | LIQUID-GAS | 351.57 (K→) | ± 0.253965 | ☑ | — |
| CRITICAL PRESSURE | NIST | LIQUID-GAS | 6267.91 (kPa→) | ± 62.6791 | | — |

FIG. 12A

SINGLE-VALUED PROPERTIES

150 →

| PROPERTY | SOURCE | PHASE | VALUE | | UNCERTAINTY | EXP. DATE | CONDS |
|---|---|---|---|---|---|---|---|
| BOILING POINT | NIST | LIQUID - GAS | 351.57 | (K ▼) | ±0.253965 | | — |
| CRITICAL PRESSURE | NIST | LIQUID - GAS | 6267.91 | (kPa ▼) | ±62.6791 | ☑ | — |
| CRITICAL TEMP | NIST | LIQUID - GAS | 514.709 | (K ▼) | ±2.57355 | ☑ | — |
| CRITICAL DENSITY | NIST | LIQUID - GAS | 273.142 | (kg/m³ ▼) | ±2.73142 | ☑ | — |
| TRIPLE POINT TEMP | NIST | SOLID-LIQ-GAS | 159.014 | (K ▼) | ±0.420254 | ☑ | — |
| ENTHALPY OF FUSION | NIST | SOLID-LIQ-GAS | 4.931 | (kj/mol ▼) | ±0.018 | | — |
| MOLECULAR WEIGHT | NIST | — | 46.06844 | | | 154 | |

AT STANDARD CONDITIONS UNLESS OTHERWISE STATED

MULTI-VALUED PROPERTIES

PHASE TRANSITION AND CRITICAL PROPERTIES

∧ BOILING POINT

∧ MELTING PRESSURE

∧ VAPOR PRESSURE

THERMODYNAMIC PROPERTIES

∧ ENTHALPY

MULTI-VALUED PROPERTIES      150 ⟶

PHASE TRANSITION AND CRITICAL PROPERTIES
- BOILING POINT
- MELTING PRESSURE
- VAPOR PRESSURE

THERMODYNAMIC PROPERTIES
- ENTHALPY
- ENTHALPY OF SUBLIMATION
- ENTHALPY OF FORMATION
- ENTROPY
- HEAT CAPACITY AT CONSTANT PRESSURE
- HEAT CAPACITY AT SATURATION PRESSURE
- PRESSURE COEFFICIENT OF ENTHALPY
- SUBLIMATION PRESSURE

THERMOPHYSICAL PROPERTIES
- ADIABATIC COMPRESSIBILITY
- COMPRESSIBILITY FACTOR

FIG. 12C

| 100 ⟶ | | | 150 ⟶ | | | | | | | | | | | |
|---|---|---|---|---|---|---|---|---|---|---|---|---|---|---|
| MULTI-VALUED PROPERTIES | | | | | | | | | | | | | | |
| PHASE TRANSITION AND CRITICAL PROPERTIES | | | | | | | | | | | | | | |
| ∧ BOILING POINT | | | | | | | | | | | | | | |
| ∧ MELTING PRESSURE | | | | | | | | | | | | | | |
| ∧ VAPOR PRESSURE | | | | | | | | | | | | | | |
| THERMODYNAMIC PROPERTIES | | | | | | | | | | | | | | |
| ∧ ENTHALPY | | | | | | | | | | | | | | |
| ∧ ENTHALPY OF SUBLIMATION | | | | | | | | | | | | | | |
| ∧ ENTHALPY OF FORMATION | | | | | | | | | | | | | | |
| ∧ ENTROPY | | | | | | | | | | | | | | |
| ∧ HEAT CAPACITY AT CONSTANT PRESSURE | | | | | | | | | | | | | | |
| ∧ HEAT CAPACITY AT SATURATION PRESSURE | | | | | | | | | | | | | | |
| ∧ PRESSURE COEFFICIENT OF ENTHALPY | | | | | | | | | | | | | | |
| ∧ SUBLIMATION PRESSURE | | | | | | | | | | | | | | |
| THERMOPHYSICAL PROPERTIES | | | | | | | | | | | | | | |
| ∧ ADIABATIC COMPRESSIBILITY | | | | | | | | | | | | | | |
| ∧ COMPRESSIBILITY FACTOR | | | | | | | | | | | | | | |

FIG. 12D

- JOULE-THOMSON COEFFICIENT
- SECOND VIRIAL COEFFICIENT
- THIRD VIRIAL COEFFICIENT
- SPEED OF SOUND

RHEOLOGICAL PROPERTIES
- DYNAMIC VISCOSITY

SURFACE PROPERTIES
- SURFACE TENSION

OPTICAL PROPERTIES
- REFRACTIVE INDEX

TRANSPORT PROPERTIES
- THERMAL CONDUCTIVITY

FIG. 12E

| SINGLE-VALUED PROPERTIES | | | | | | |
|---|---|---|---|---|---|---|
| PROPERTY | | | | | P. DATE | DOWNLOAD CONDS. |
| BOILING POINT | | | | | ☑ | — |
| CRITICAL PRESS| | | | | | ☑ | — |
| CRITICAL TEMPE| | | | | | ☑ | — |
| CRITICAL DENSIT| | | | | | ☑ | — |
| TRIPLE POINT TE| | | | | | | — |
| ENTHALPY OF FU| | | | | | | — |
| MOLECULAR WEI| | | | | | | — |

*AT STANDARD CONDITIONS UNLESS OTHERWISE STATED*

EXPERIMENTS (CRITICAL PRESSURE) — NIST

| LITERATURE SOURCE | YEAR | VALUE (kPa) | UNCET. |
|---|---|---|---|
| AUTHORS: JOHN DOE<br>TITLE: VAPOR PRESSURES OF SATURATED VAPORS AT HIGH TEMPS | 1879 | 6292 | 150 |
| AUTHORS: JAMES DOE<br>TITLE: ON EVAPORATION AND DISSOCIATION.<br>II A STUDY OF THE THERMAL PROPERTIES OF | 1886 | 6360 | 222.915 |
| AUTHORS: JAMES DOE | 1893 | 6312.5475 | 162.12 |

MULTI-VALUED PROPERTIES

PHASE TRANSITION AND CRITICAL PROPERTIES

∧ BOILING POINT

∧ MELTING PRESSURE

∧ VAPOR PRESSURE

THERMODYNAMIC PROPERTIES

∧ ENTHALPY

HEXAFLUOROETHANE (176A)

SMILES  FC(F)(F)C(F)(F)F
LINE FORMULA  —
MOLFILE  ⤓ DOWNLOAD
SYNONYMS
- (1,1,1,2,2,2-ETHANE, HEXAFLUORO-)
- (1,1,1,2,2,2-HEXAFLUORO-ETHANE)
- (1,1,1,2,2,2-HEXAFLUOROETHANE)

EXPAND ALL SYNONYMS

TAXONOMY

| CLASSIFICATION NO. | 1 |
|---|---|
| SECTION | ORGANIC COMPOUNDS |
| CLASS | HALOGENATED ORG. COMP... |
| SUB-CLASS | FLUORINATED HYDRO... |
| GROUP | FLUORINATED ALI. HYDRO... |

| CLASSIFICATION NO. | 2 |
|---|---|
| SECTION | ORGANIC COMPOUNDS |
| CLASS | REFRIGERANTS |
| SUB-CLASS | — |

---

2-METHYLPROP-1-ENE (176B)

SMILES  C=C(C)C
LINE FORMULA  —
MOLFILE  ⤓ DOWNLOAD
SYNONYMS
- (1,1-DIMETHYLETHYLENE)
- (1-PROPENE, 2-METHYL-)
- (1-PROPENE-2-METHYL-)

EXPAND ALL SYNONYMS

TAXONOMY

| CLASSIFICATION NO. | 1 |
|---|---|
| SECTION | ORGANIC COMPOUNDS |
| CLASS | HYDROCARBONS |
| SUB-CLASS | ALIPHATIC HYDROCARBONS |
| GROUP | ALKENES |

---

SULFUR HEXAFLUORIDE (176C)

SMILES  FS(F)(F)(F)(F)F
LINE FORMULA  —
MOLFILE  ⤓ DOWNLOAD
SYNONYMS
- (BRI) (ELEGAS)
- (HEXAFLURURO-LAMBDA^6-SULF-)

EXPAND ALL SYNONYMS

TAXONOMY

| CLASSIFICATION NO. | 1 |
|---|---|
| SECTION | INORGANIC COMPOUNDS |
| CLASS | NONMETAL HALIDES |
| SUB-CLASS | — |
| GROUP | — |

(100, 170)

| HEXAFLUOROETHANE | 2-METHYLPROP-1-ENE | SULFUR HEXAFLUORIDE |

CLASSIFICATION NO. 2
SECTION    ORGANIC COMPOUNDS
CLASS      REFRIGERANTS
SUB-CLASS  -
GROUP      -

SINGLE-VALUED PROPERTIES

▽ TYPE TO FILTER PROPERTIES

PHASE TRANS, CRITI PROP  >  THERMODYNAMIC PROPT  >  THERMOPHYSICAL PROPT  >

ATOMIC MOLECULAR PROPT  >

MULTI-VALUED PROPERTIES

▽ TYPE TO FILTER PROPERTIES

PHASE TRANS, CRITI PROP  >  THERMODYNAMIC PROPT  >  THERMOPHYSICAL PROPT  >

RHEOLOGICAL PROPERTIES  >  SURFACE PROPERTIES  >  TRANSPORT PROPERTIES  >

OPTICAL PROPERTIES  >

↗ DOWNLOAD

FIG. 17C

SYSTEMS AND METHODS FOR ELECTRONIC SEARCHING OF MATERIALS AND MATERIAL PROPERTIES

CROSS-REFERENCE TO RELATED APPLICATIONS

This application is a continuation of United States Patent Application PCT Serial No. PCT/US17/22941, entitled "SYSTEMS AND METHODS FOR ELECTRONIC SEARCHING OF MATERIALS AND MATERIAL PROPERTIES", and filed on Mar. 17, 2017, which claims the benefit of priority from U.S. Provisional Application No. 62/309,701, entitled "SYSTEMS AND METHODS FOR VISUAL ANALYTICS", filed Mar. 17, 2016, the disclosures of which are expressly incorporated herein by reference in their respective entireties.

BACKGROUND

Field

The present specification generally relates to normalizing electronic data from a plurality of sources and, more particularly, to normalizing and storing electronic data in a nested model for the ability to perform nested non-hierarchical queries over text and data from a plurality of different data sources.

Technical Background

Presently, engineering data for materials is available from a wide variety of different sources in a wide variety of different formats. As one example, materials may be chemical materials, such chemical compounds or chemical elements. An engineer desiring to select a chemical material during a design process may be required to review data from several different sources to make a determination as to which chemical materials to use. For example, an engineer may be required to sort through many different static tables and charts to select a desired chemical material. The approach and challenges are similar for a mechanical or civil engineer selecting a metal or an alloy. Such siloed processes may be very time consuming and prone to human error.

Different sources may provide some of the same information but in different formats. In one example, a first source may provide values for a particular property using a first unit, and a second source may provide values for the particular property using a second, different unit. Additionally, the first source may use a first nomenclature for a material, and the second source may use a second, different nomenclature (e.g., synonym) for the same material. This may lead to duplicative analysis, errors and may increase the cost of development.

Further, the static tables, equations, and charts in sources make it very difficult to effectively search within a sources, let alone multiple sources. Rather, the engineer must first search for materials satisfying a range of values for a first chemical property, then a range of values for a second chemical property, and so on. Such a process may be very time consuming. In most instances, because of these challenges the sources do not support searches beyond basic searches (e.g., search by a chemical name or identifier, search for a single property, etc.)

Accordingly, a need exists for alternative data sources that assimilate data from individual sources into a normalized format, and allow a user to simultaneously search multiple sources in a non-hierarchical manner to quickly and efficiently uncover desired materials.

SUMMARY

In one embodiment, a method includes receiving, using a computing device, electronic data from a source, the electronic data including a plurality of entities, and each entity of the plurality of entities including a plurality of source properties. The electronic data is formatted in a source format. The method further includes converting, using the computing device, the plurality of source properties of each entity of the plurality of entities into a plurality of normalized properties such that the electronic data is converted to normalized electronic data in a normalized format, and storing the normalized electronic data in a nested model within a non-transitory computer-readable medium. A first sub-set of the plurality of normalized properties is stored in a first level of the nested model, and a second sub-set of the plurality of normalized properties is stored in a second level of the nested model. The first level is lower than the second level. The method further includes receiving, using the computing device, at least one query, wherein the at least one query is directed toward at least one of: one or more normalized material or properties of the first sub-set of the plurality of normalized properties stored in the first level of the nested model, and one or more normalized properties of the second sub-set of the plurality of normalized properties stored in the second level of the nested model. The method also includes searching at least one of the first sub-set and the second sub-set to determine one or more entities satisfying the at least one query, and causing for display on an electronic display the one or more entities satisfying the query.

In another embodiment, a system includes a processing device and a non-transitory, processor-readable storage medium, the non-transitory, processor-readable storage medium having programming instructions that, when executed, causes the processing device to receive electronic data from a source. The electronic data includes a plurality of entities, and each entity of the plurality of entities includes a plurality of source properties. The electronic data is formatted in a source format. The programming instructions further cause the processing device to convert the plurality of source properties of each entity of the plurality of entities into a plurality of normalized properties such that the electronic data is converted to normalized electronic data in a normalized format, and store the normalized electronic data in a nested model stored within the non-transitory computer-readable medium. A first sub-set of the plurality of normalized properties is stored in a first level of the nested model, and a second sub-set of the plurality of normalized properties is stored in a second level of the nested model. The first level is lower than the second level. The programming instructions further cause the processing device to receive at least one query, wherein the at least one query is directed toward at least one of: one or more normalized properties of the first sub-set of the plurality of normalized properties stored in the first level of the nested model, and one or more normalized properties of the second sub-set of the plurality of normalized properties stored in the second level of the nested model. The programming instructions further cause the processing device to search at least one of the first sub-set and the second sub-set to determine one or more entities satisfying the at least one query, and cause for display on an electronic display the one or more entities satisfying the query.

In yet another embodiment, a method of fabricating an article includes, in a graphical user interface displayed on an electronic display, selecting a first property corresponding to a material, wherein selection of the first property causes a first graph to be displayed such that values of the first property is on a first axis of the first graph and a number of materials is on a second axis of the first graph. The method further includes entering a range of values for the first property, wherein entering the range of values for the first property causes the first axis of the first graph to be limited to the range of values, and entering the range of values for the first property causes the graphical user interface to display only materials satisfying the range of values for the first property. The method further includes determining a desired material satisfying the range of values for the first property, and incorporating the desired material into the article.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

FIGS. 9A and 9B depict an example class filtering window of the graphical user interface depicted in FIG. 8 according to one or more embodiments described and illustrated herein;

FIGS. 12A-12F depict an example chemical material property display window of the graphical user interface depicted in FIG. 8 according to one or more embodiments described and illustrated herein;

FIGS. 17A-17C depict an example compare window of the graphical user interface depicted in FIG. 8 comparing selected chemical materials according to one or more embodiments described and illustrated herein.

DETAILED DESCRIPTION

Referring generally to the figures, embodiments described herein are directed to systems and methods providing the importation of electronic data from a variety of different sources. The source electronic data among the various different sources may have different formatting. Embodiments convert the source electronic data into normalized data so that the normalized data may be searched by a graphical user interface. The data may be stored in a nested model data structure such that a plurality of normalized entities and their properties (e.g., materials and their material properties) may be individually and collectively searched or browsed using a graphical user interface.

More particularly, embodiments of the present disclosure may enable importation of source electronic data regarding materials and their properties. As used herein, the term "materials" refers to any type of material, such as chemical materials (e.g., chemical compounds and chemical elements). Different sources have different source formats for the source electronic data. Embodiments of the present disclosure convert the source data regarding the chemical materials into normalized electronic data. Thus, the normalized data provides a standard or framework for items such as nomenclature, units, phase descriptions, and the like. Embodiments also enable users to search a vast number of chemical materials for chemical materials meeting one or more specific properties using an intuitive graphical user interface. In this manner, users may simultaneously search different properties to uncover specific chemical materials meeting those different properties.

Various embodiments of systems and methods for inputting, normalizing, indexing, and searching data from different sources are described in detail below.

Figure 1:
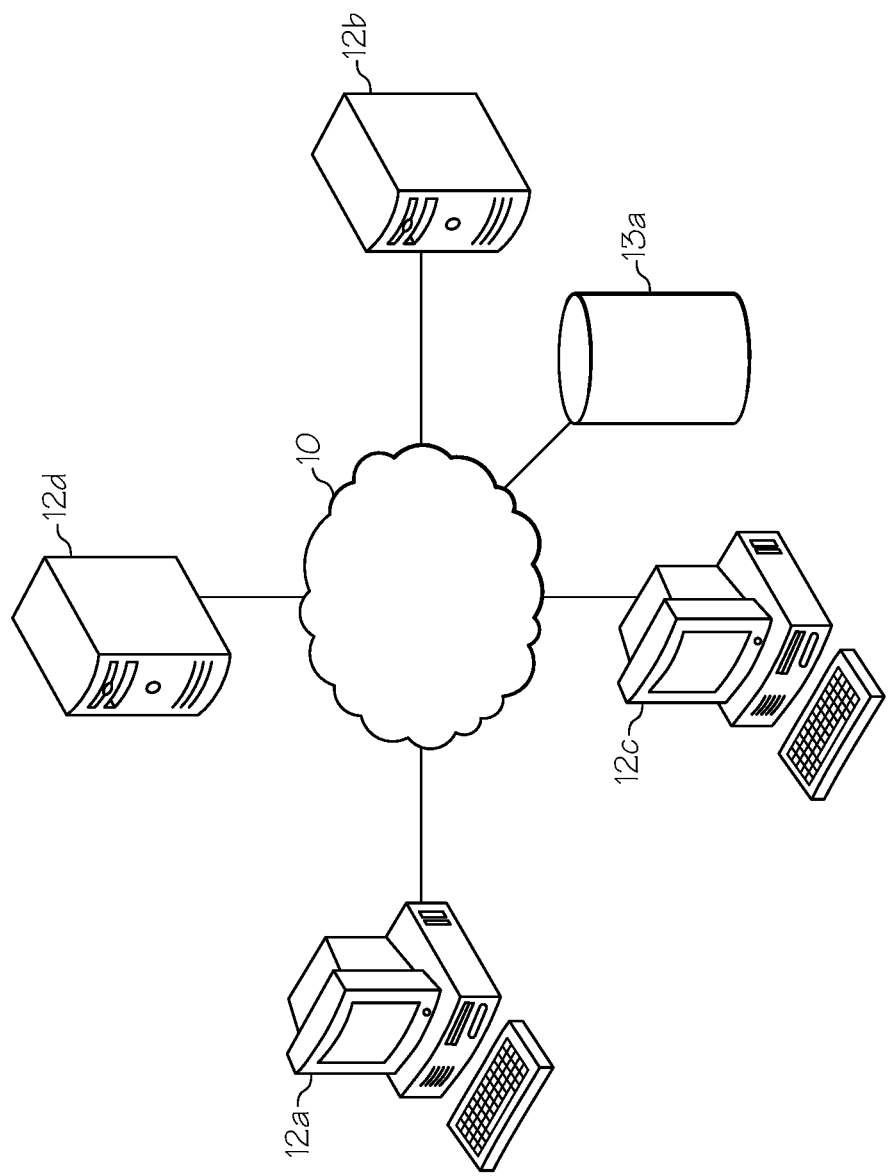
FIG. 1 depicts a schematic illustration of a computer system for gathering, normalizing and searching data according to one or more embodiments described and illustrated herein.

Referring now to the drawings, FIG. 1 depicts an exemplary computing network, illustrating components for a system for inputting, normalizing and indexing data from a variety of different sources that may be used to search for entities, such as materials, according to embodiments shown and described herein. As illustrated in FIG. 1, a computer network 10 may include a wide area network, such as the internet, a local area network (LAN), a mobile communications network, a public service telephone network (PSTN) and/or other network and may be configured to electronically connect a user computing device 12a, a server computing device 12b, an administrator computing device 12c, and one or more data sources 13. One or more additional computing devices 12d may also be communicatively coupled to the computer network 10. It should be understood that the non-limiting system illustrated in FIG. 1 is provided for illustrative purposes only, and that other configurations are also possible. Further, in some embodiments, the methods may be performed not on a system or network, but locally within a single computing device, such as a personal computer, smart phone, and the like. For example, the embodiments described herein may be incorporated into an operating system running on a computing device to search for documents stored locally on the computing device.

In the exemplary computing network, the user computing device 12a may be used to input, normalize and index data, such as material data, as well as perform searching of the normalized and indexed data. The user computing device 12a may also be utilized to perform other user functions. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c, as well as any other computing device coupled to the computer network 10, may be used to input one or more documents into the electronic document corpus.

The user computing device 12a and the administrator computing device 12c may be capable of displaying the graphical user interfaces described herein below, such that users may enter search queries that may be used to search data stored in one or more databases associated with the server computing device 12b, or other databases coupled to the computer network 10.

It should be understood that while the user computing device 12a and the administrator computing device 12c are depicted as personal computers and the server computing device 12b and the other computing device 12d are depicted as servers, these are nonlimiting examples. More specifically, in some embodiments any type of computing device (e.g., mobile computing device (smart phone, tablet computer, laptop computer, etc.), personal computer, server, etc.) may be utilized for any of these components. Additionally, while each of these computing devices are illustrated in FIG. 1 as a single piece of hardware, this is also merely an example. More specifically, each of the user computing device 12a, server computing device 12b, administrator computing device 12c, and other computing device 12d may represent a plurality of computers, servers, databases, mass-storage devices, etc.

Figure 2:
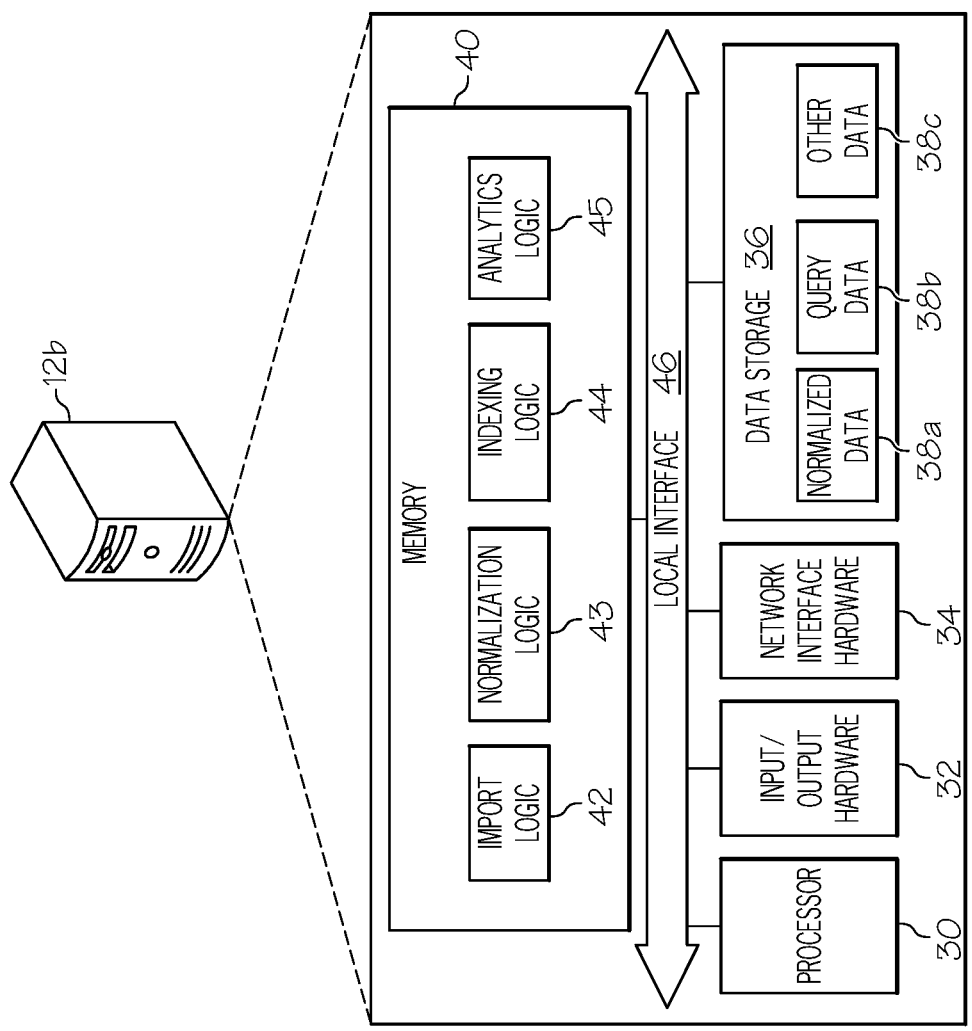
FIG. 2 depicts a schematic illustration of the server computing device from FIG. 1, further illustrating hardware and software that may be utilized in performing the functionalities described herein according to one or more embodiments described and illustrated herein.

FIG. 2 depicts the server computing device 12b depicted in FIG. 1, further illustrating a system for inputting, normalizing and indexing data from a variety of sources, as well as receiving search queries to retrieve entities, such as materials, and/or a non-transitory computer usable medium having computer readable program code for performing such functionalities embodied as hardware, software, and/or firmware, according to embodiments shown and described herein. While in some embodiments, the server computing device 12b may be configured as a general purpose computer with the requisite hardware, software, and/or firmware, in some embodiments, that server computing device 12b may be configured as a special purpose computer designed specifically for performing the functionality described herein. It should be understood that the software, hardware, and/or firmware components depicted in FIG. 2 may also be provided in the user computing device 12a and/or the administrator computing device 12c depending, on the particular application.

As also illustrated in FIG. 2, the server computing device 12b (or user computing device 12a, or administrator computing device 12c) may include a processor 30 (i.e., a processing device capable of executing computer-readable instructions), input/output hardware 32, network interface hardware 34, a data storage component 36 (which may store normalized data 38a (e.g., normalized material data), query data 38b (i.e., data relating to queries run on the normalized data, and other data 38c (e.g., any other data, such as raw source data and data required to import, normalize, index and search), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store import logic 42, normalization logic 43, indexing logic 44, and analytics logic 45 (each of which may be embodied as computer readable program code, firmware, or hardware, as an example). It should be understood that operating logic (e.g., a computer operating system) may also be stored in the non-transitory memory component 40. A local interface 46 is also included in FIG. 2 and may be implemented as a bus or other interface to facilitate communication among the components of the server computing device 12b.

The processor 30 may include any processing device configured to receive and execute computer readable code instructions (such as from the data storage component 36 and/or memory component 40). The input/output hardware 32 may include a graphics display device, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b, and may be configured to store one or more pieces of data for access by the server computing device 12b and/or other components. As illustrated in FIG. 2, the data storage component 36 may store normalized data 38a, which in at least one embodiment includes normalized material data indexed for searching. The normalized data 38a may be stored in one or more data storage devices. Similarly, query data 38b may be stored by the data storage component 36 and may include information relating to the searching of the normalized data 38a. Other data 38c may be stored in the data storage component 36 to provide support for functionalities described herein.

Included in the memory component 40 may be the import logic 42, normalization logic 43, indexing logic 44, and analytics logic 45. The import logic 42 is operable to receive and prepare raw source data received from one or more sources in preparation for normalization. As described in more detail below, the normalization logic 43 may reside in the memory component 40 and may be configured to facilitate normalization of the raw source data. The indexing logic 44 is configured to index or otherwise store the normalized data, such as in a nested model as described below. The analytics logic 45 provides the searching functionalities using a graphical user interface described herein.

Operating logic may include an operating system and/or other software for managing components of the server computing device 12b. The operating logic may also include computer readable program code for displaying the graphical user interface.

It should be understood that the components illustrated in FIG. 2 are merely exemplary and are not intended to limit the scope of this disclosure. More specifically, while the components in FIG. 2 are illustrated as residing within the server computing device 12b, this is a nonlimiting example. In some embodiments, one or more of the components may reside external to the server computing device 12b. Similarly, while FIG. 2 is directed to the server computing device 12b, other components such as the user computing device 12a and the administrator computing device 12c may include similar hardware, software, and/or firmware.

Figure 3:
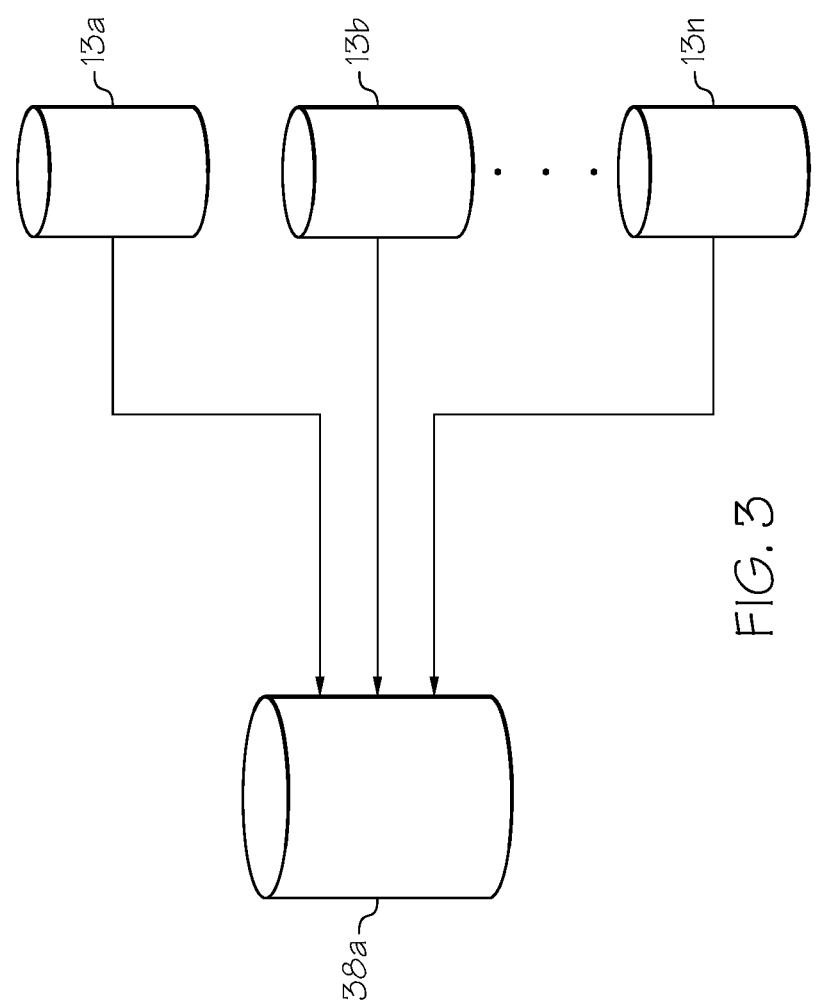
FIG. 3 depicts a schematic illustration of a plurality of sources providing electronic source data to a data structure according to one or more embodiments described and illustrated herein.

As stated above, embodiments of the present disclosure are configured to import electronic data from a plurality of different sources, with the electronic data for each source being formatted in its own source format. Referring to FIG. 3, normalized data 38a may be stored in a storage device that is configured to receive electronic data from a plurality of sources 13a, 13b . . . 13n. Electronic data may be received from any number of sources.

The electronic data may include data regarding a plurality of entities, such as materials, which may include, without limitation, chemical materials. Although examples of entities are described as chemical materials herein, embodiments are not limited thereto. The entities may be any articles, particles, components, devices and the like having particular properties associated therewith.

The plurality of sources 13a, 13b . . . 13n may be any source. In one non-limiting example, a first source 13a may be the National Institute of Standards and Technology (NIST) and a second source 13b may be the Design Institute for Physical Properties (DIPPR). Although each of these two sources provides property data regarding chemical materials, the source formatting for each of these two sources is different, thereby making it difficult to search for chemical materials using the data of each of the two sources.

The electronic data may be received by any means such as, without limitation, direct access to a data base, e-mail, physical medium (e.g., memory stick, compact disk, and the like). Although FIG. 1 illustrates the source 13 as coupled to the network 10, embodiments are not limited thereto. For example, the electronic data may be stored on a portable computer-readable medium that is inserted into the server computing device 12b or the administrator computing device 12c.

Figure 4:
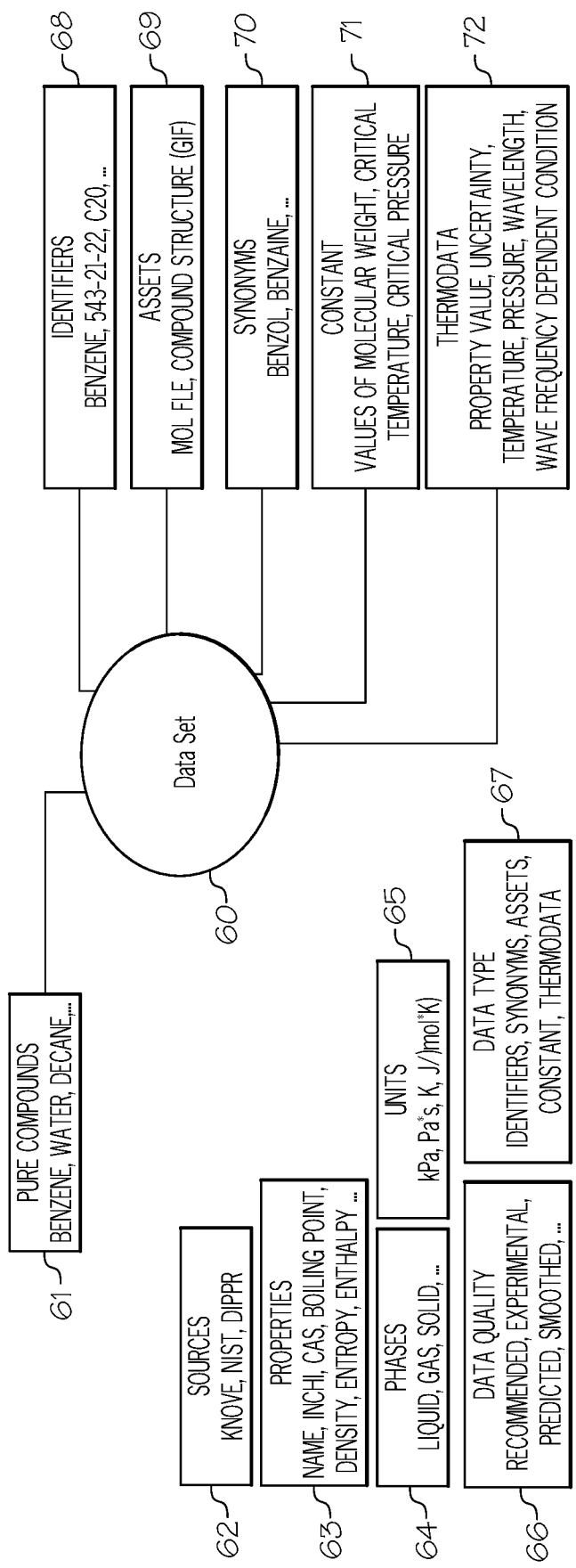
FIG. 4 depicts a graphical illustration of properties and attributes of chemical materials and properties according to one or more embodiments described and illustrated herein.

Referring now to FIG. 4, the variety of metadata and properties of the source data is graphically illustrated. As shown in FIG. 4, a data set 60 (which may be stored in the master index 38a) receives chemical materials 61 from a variety of sources (e.g., first source 13a and second source 13b). Each chemical material may include metadata in the original source formatting. Example source electronic data for the chemical materials received by the system are illustrated by blocks 62-67. Block 62 represents source identifier information that indicates the source from which the chemical material is received. Block 63 represented property information associated with the chemical material such as, without limitation, the name and identifiers of the chemical material and specific properties of the chemical material (e.g., density, entropy, etc.). Block 64 represents phase information for the chemical material. It is noted that each chemical material may exist in one or more phases, with properties of the chemical material being different for each phase. Block 65 represents unit information for the various properties. Block 66 represents information regarding the quality of the data as provided by the source (e.g., recommended, experimental, predicted, smoothed, and the like). The data quality may be used by the user to develop a level of trust in the particular data. Block 67 represents the type of data (e.g., identifiers, synonyms, assets, constant, thermodata).

Blocks 68-72 represent normalized electronic data organized by the system following receipt of the source electronic data for various properties and information types associated with the imported chemical compounds. Block 68 represents values for the property identifiers of the chemical compound, such as name, molecular formula, simplified molecular-input line-entry system (SMILES), and international chemical identifier (inChi), hashed inChi (InChiKey). In the illustrated example, the name of the chemical compound is benzene, the SMILES is 543-21-22, and the molecular formula is $C_2O$. It should be understood that other information may be included.

Block 69 represents asset data that may be associated with the imported chemical compound, such as, without limitation, a MOL file and an image of the chemical compound structure. Block 70 represents synonyms for the chemical compound. Block 71 includes values for constants (i.e., single-value properties) for the chemical compound, such as, without limitation, molecular weight, critical temperature, and critical pressure. Block 72 represents property values for one particular property category, thermodata. The thermodata values of block 72 include, but are not limited to, a value of the particular property and other variables associated with the value of the particular property. Such variables include, but are not limited to, uncertainty, temperature, pressure, wavelength, and wave frequency dependent condition. It should be understood that additional property categories beyond thermodata may be provided such as, without limitation, surface property data, optical property data, rheological property data, and the like.

The electronic data may be stored in different data structure formats among the different sources. For example, one source may store the source electronic data in a database in accordance with SQLite, and another source may store the source electronic data in a database in accordance with Microsoft® Access. Yet another source may store the source electronic data in a flat file, such as a spreadsheet.

As noted above, the formatting of the electronic data may be completely different between the sources. For example, a first source may refer to a particular property as "A" while a second source may refer to the same particular property as "B." Further, the units of measurement may be different among the different sources (e.g., metric vs. imperial). For example, a first source may provide a value for a property in Kelvin while a second source may provide a value for the same property in Celsius.

Embodiments of the present disclosure convert the electronic data from the source formats of the different sources into normalized electronic data in a normalized format. The normalized electronic data may then be indexed to provide electronic searching as described below.

Embodiments of the present disclosure may utilize one or more master lists that defines the normalized electronic data and the forms its values should take. For example, the master list may define the normalized form for, without limitation: the chemical material name, identification of the chemical material (e.g., inChi), phase information, units for each property, assignment of a property to a property category (e.g., vapor pressure assigned to the category "phase transition and critical properties" as described below), data quality, and chemical class, among others.

Thus, the system detects the attributes of the chemical materials in the source data and automatically maps the attributes to the normalized form as defined by the master list. For example, for each chemical material found in the source electronic data, the name of the chemical material is mapped from the name in the source electronic data to the normalized name of the chemical material as defined by the master list, and is then stored in a nested model data structure, as described in more detail below. Similarly, the phase for each name is mapped from the phase as defined in the source electronic data to the normalized phase as defined by the master list, and property data (e.g., properties such as compressibility factor, density, vapor pressure, and the like) for each phase of each name is mapped from the property format of the source electronic data to the normalized property format as defined by the master list.

Further, the system automatically detects the units of the properties in the source electronic data and converts the units to normalized units according to the master list.

As noted above, the system normalizes phase information from the source electronic data into a normalized form. As a non-limiting example, NIST has twenty-seven different phase descriptions while DIPPR has only four phase descriptions. Normalized phase descriptions are defined by the master list such that the phase information from the source electronic data is converted to the normalized phase description.

Additionally, the sources may indicate the quality of data in different ways. Between NIST and DIPPR, there are many different data quality combinations (e.g., recommended, experimental, predicted, experimental and predicted is true, acceptance, smoothed, and others). The master list provides a set number of normalized data quality descriptions to which the source electronic data is mapped.

As noted above, the system organizes the properties of the chemical materials into property categories. Non-limiting examples of property categories include, but are not limited to, phase transition and critical properties, thermodynamic properties, thermophysical properties, rheological properties, surface properties, optical properties, and transport properties. Accordingly, each individual property is assigned to a property category according to the master list.

Additionally, the chemical compounds (or other entities) may be organized in a taxonomy. It should be understood that any taxonomy may be utilized wherein classes and sub-classes are organized by level in the taxonomy. In one non-limiting example, the chemical compounds are organized by functional group. Table 1 below provides a non-limiting, partial taxonomy for the functional group of acetals, wherein level 1 is organic compounds, level 2 is the functional group of acetals, and levels 3 and 4 are sub-classes of acetals. Additional functional groups for level 2 include, but are not limited to, alcohols, aldehydes, alkoxides and the like. It should be understood that embodiments are not limited to the taxonomy structure of Table 1, and other taxonomies may be utilized. Individual chemical compounds may be associated with one or more positions of the taxonomy. It should also be understood that more levels than four levels may be provided (e.g., down to the level of species of chemical compound).

TABLE 1

Example Taxonomy for Acetals

| Level 1 | Level 2 | Level 3 | Level 4 |
|---------|---------|---------|---------|
| Organic compounds | | | |
| | Acetals | | |
| | | Aliphatic acetals | |
| | | | Alkyl acetals |
| | | | Alkenyl acetals |
| | | | Alkynyl acetals |
| | | Alicyclic acetals | |
| | | | Cycloalkyl acetals |
| | | | Cycloalkenyl acetals |
| | | Aromatic acetals | |
| | | | Monocyclic aromatic acetals |
| | | | Polycyclic aromatic acetals |
| | | Heterocyclic-acetals | |

According to embodiments, the normalized electronic data is indexed and stored in a nested model. The nested model may be defined by a relational database that defines the relationships between various properties of the chemical materials. The values of a first property may affect the values of a second property. For example, values of temperature and/or pressure may affect the phase of a particular property. Accordingly, some properties depend from one or more other properties. These relationships between properties may be defined by a nested model having property nodes that may be searched, as described in more detail below.

Figure 5:
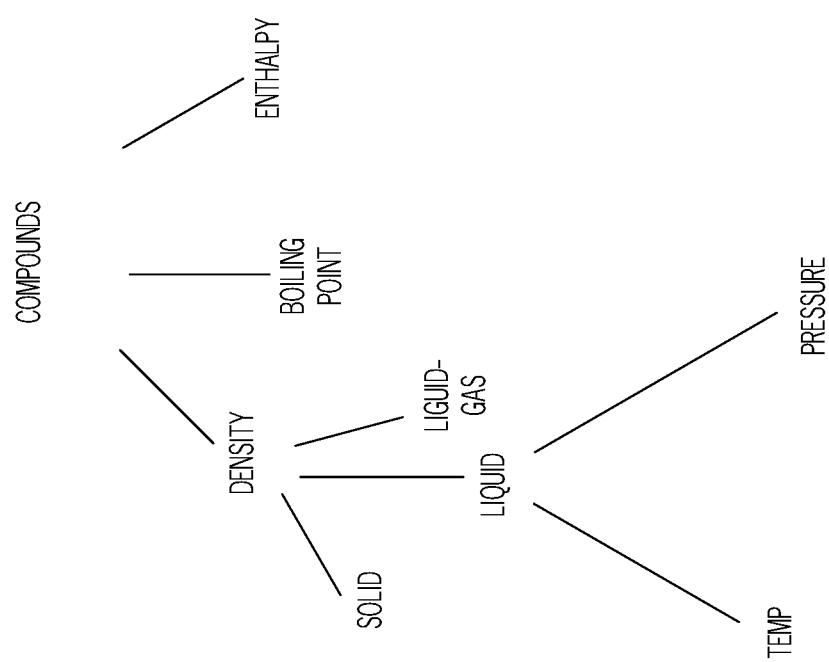
FIG. 5 depicts a graphical illustration of a partial nested model according to one or more embodiments described and illustrated herein.

FIG. 5 graphically illustrates a non-limiting, partial nested model 80 defining relationships between a plurality of properties of chemical materials. It should be understood that many other properties may be included in the nested model 80, and that the nested model 80 of FIG. 5 is for illustrative purposes only. As shown in FIG. 5, at the top level (i.e., fourth level) are the chemical materials. At a third level below the fourth level are several properties including density, boiling point and enthalpy. The phases of solid, liquid and liquid gas depend from density at a second level in the non-limiting example. Finally, the properties of temperature and pressure are illustrated as depending from the liquid phase in a bottom, first level of the nested model. Accordingly, sub-sets of the plurality of normalized properties are stored within various levels of the nested model 80.

The relationships between the properties defined by the nodes of the various levels are determined by the edges of the nested model. Thus, manipulation of temperature and pressure may affect the phases, density values and ultimately the materials meeting the values of the desired temperature and pressure, as well as the phase and density. As described in more detail below, any one of the nodes of the nested model may be searched in the form of a non-hierarchical, nested search. The user may choose which properties are of interest, and perform nested searches on the nested model to surface chemical materials having the desired properties. Thus, individual search queries may be executed for individual nodes of the nested model. The system may display on an electronic display one or more entities satisfying the query while maintaining the integrity of all parameters of the query across all selected properties queried in any non-hierarchical order.

In some cases, the source electronic data may not provide data points regarding a particular property of a chemical material but rather an equation that defines the values of the particular property as a function of one or more variables. In some embodiments, the equations are automatically detected in the source electronic data. The equations are then calculated for a range of values for the one or more variables. The output of the calculation of the equation may be saved as data points for the particular property in the nested model.

The equation may be detected in the source electronic data in a variety of ways. In one example, one or more variables in the source electronic data are detected and compared to a reference list of equations to make a determination as to whether or not an equation is present in the source electronic data. In some embodiments, the entire equation and not just variables are detected and compared. The source data may also include values for one or more variables of the equation. The system may also store values for one or more variables of the equations. The system may then calculate the output of the equation using values of one or more variables as data points that are then stored in the nested model.

Figure 6:
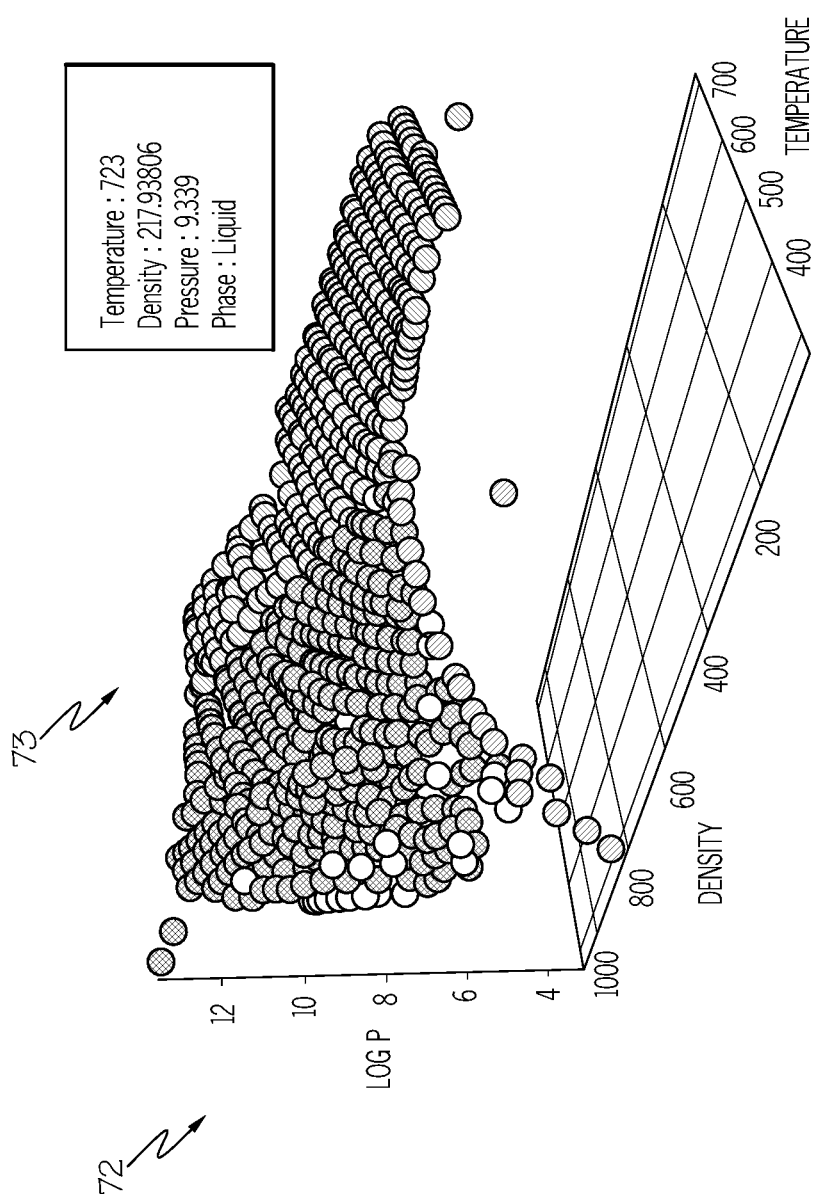
FIG. 6 depicts a graphical illustration of a three-dimensional graph of properties of density of a chemical material according to one or more embodiments described and illustrated herein.

In some cases, data points of a property are not isolated but represent curves and surfaces in multi-dimension space. One non-limiting example is thermodynamic data. To solve this problem, embodiments may store the data for particular properties in a geo-polygon form, which allows for an intersection in multi-dimensional space. As a non-limiting example, density varies as a function of both temperature and pressure. FIG. 6 is a three-dimensional chart 72 representing data points across multiple phases. Based on the data structure 73, a filtering cube may be created to define temperature, pressure and density boundaries.

Figure 7:
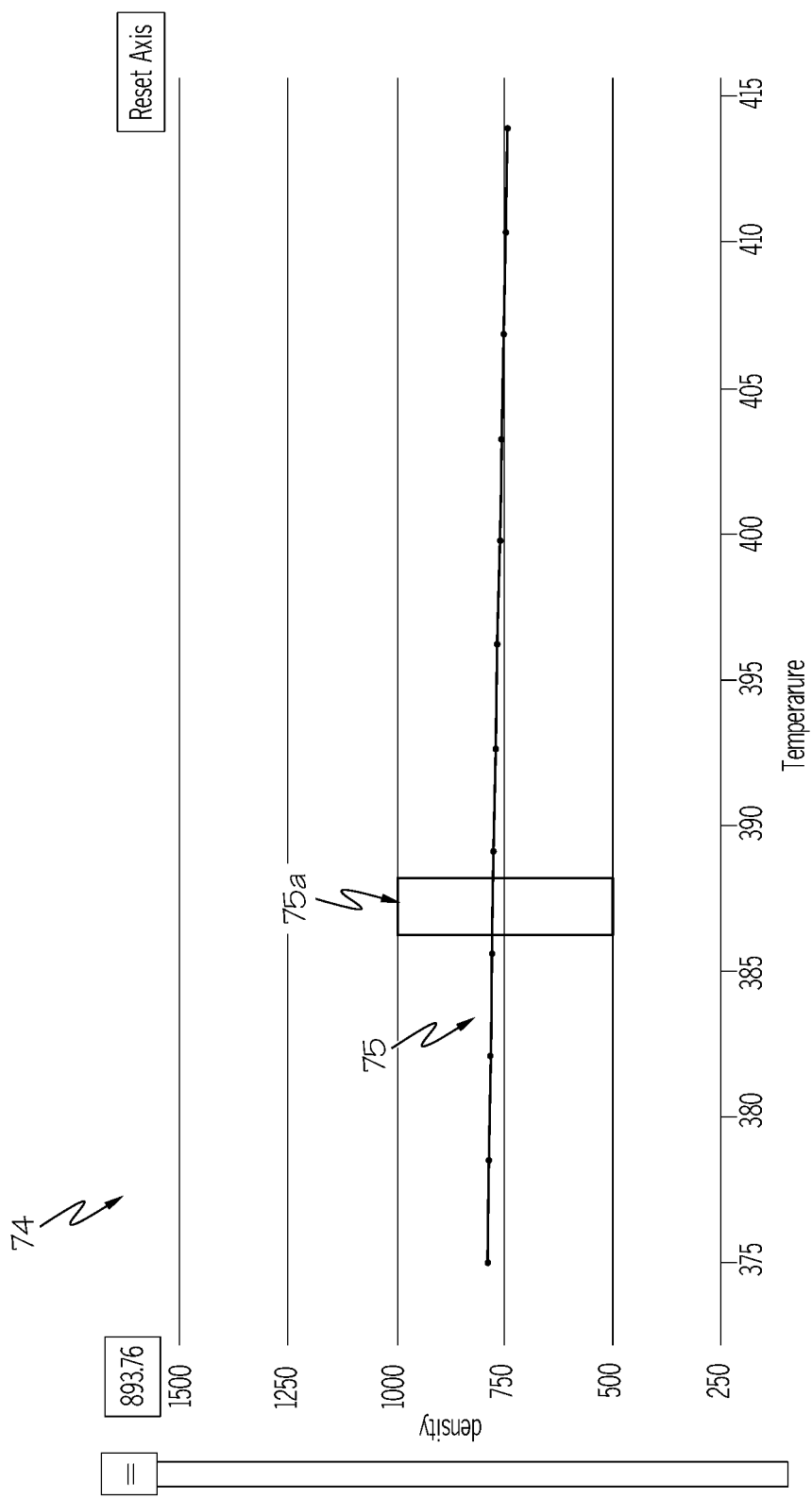
FIG. 7 depicts a graphical illustration of a curve of density as a function of temperature according to one or more embodiments described and illustrated herein.

Storing data not as individual data points but in geo-polygon form also solves a problem of interpolation, which may be an issue when there are scarce data points available in particular ranges. Referring to FIG. 7, if a user is searching a temperature range 75a where this are no data points presents, a filtering algorithm that looks for only data points would ignore the chemical material even though there is a curve within the desired temperature range 75a. Thus, this chemical material would not be available to the user even though it satisfies the user's search criteria.

However, storing the data not as individual data points but as a geo-polygon (e.g., a line in the case of FIG. 7) enables the filtering algorithm to uncover the chemical material shown in FIG. 7 even though there are no data points within the desired temperature range 75a. In this manner, embodiments may support an elastic search on the underlying normalized data. Accordingly, if a user specifies a desired property range to identify chemical materials that fit that property range, then more chemical materials may be presented to the user than the case where only data points are stored.

Figure 8:
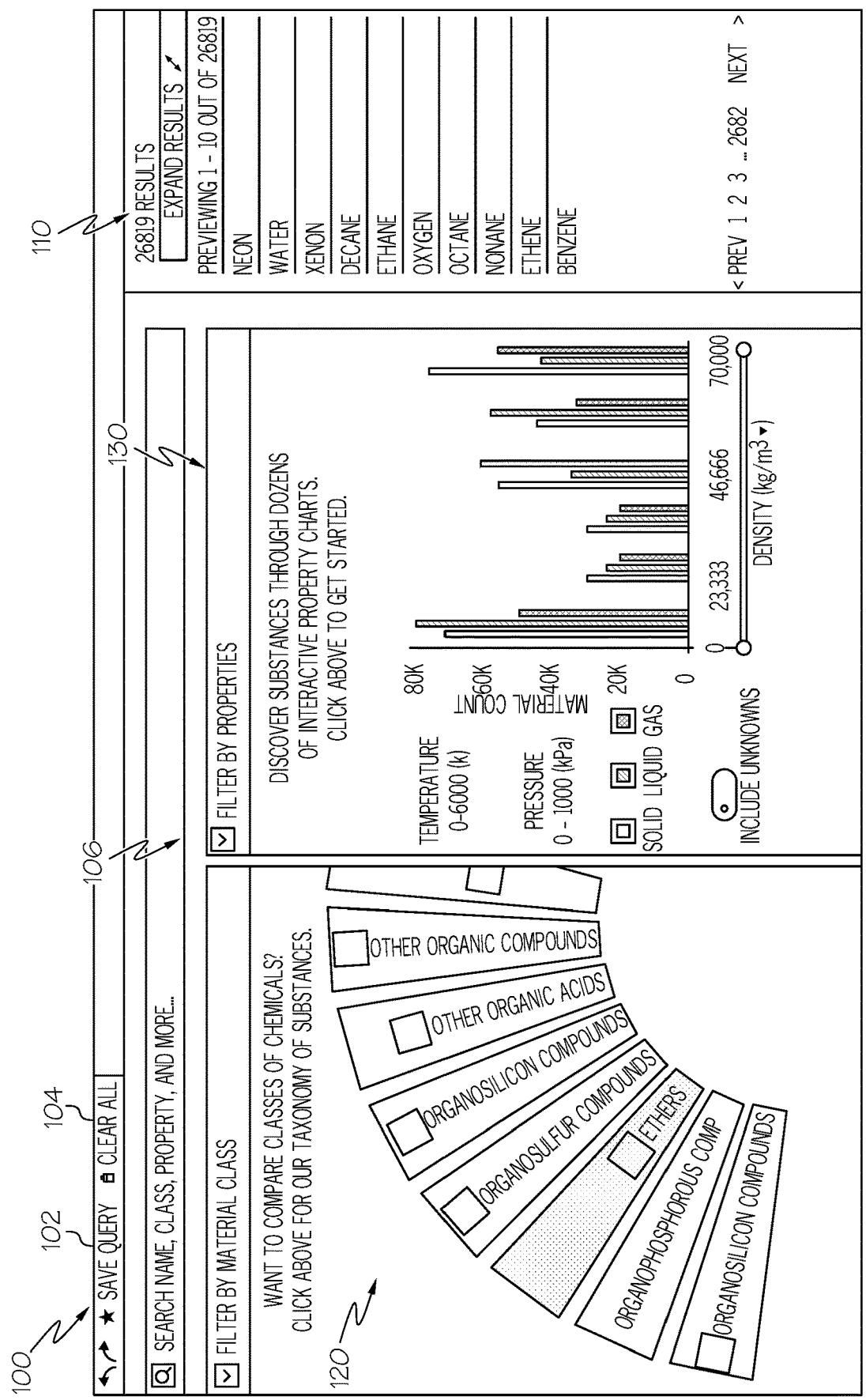
FIG. 8 depicts a graphical illustration of an example graphical user interface for searching for chemical materials according to one or more embodiments described and illustrated herein.

Referring now to FIG. 8, an example, non-limiting graphical user interface 100 for searching for entities in the form of chemical materials is schematically illustrated. The graphical user interface 100 is operable to receive search queries that search the normalized data from a variety of different sources as described above. As non-limiting examples, the sources may be NIST and DIPPR that each provide chemical material data in two different formats. As described in detail below, the example graphical user interface 100 provides a powerful tool to search source data from two different sources in a single location to quickly discover chemical materials meeting design parameters.

The graphical user interface 100 is operable to be displayed on an electronic display, such as a computer monitor, a television, a mobile device screen, and the like. The graphical user interface 100 may be provided be displayed in a web browser, or within a standalone computer application. Generally, the graphical user interface 100 includes a search field 106 operable to receive search query terms relating to aspects of chemical materials, such as the name of a chemical material, class of the chemical material, properties of the chemical material, and the like. The example graphical user interface 100 further includes a class filter window 120 for discovering chemical materials by filtering by class, and a properties filter window 130 for discovering chemical materials by filtering by chemical material properties. Each of these search windows and methods are described below. The graphical user interface 100 further includes a results window 110 listing chemical materials that meet the current criteria. As shown in FIG. 8, there are 26,819 chemical materials meeting the current criteria.

As used herein, the term "query" means any type of user input that requested information from the system, and may include action items such as, without limitation, browsing chemical materials (by clicking through a hierarchical display of chemical materials or selecting various chemical materials of interest) or search queries requesting specific types of information (e.g., type of chemical material, a name of a chemical material, a range of values for a particular property of chemical materials).

The graphical user interface 100 may also include other functionalities, such as the ability to save search queries by selection of a save query button 102 and the ability to clear all current filters by selection of a clear filter button 104. Other functionalities are also possible.

Figure 9A:
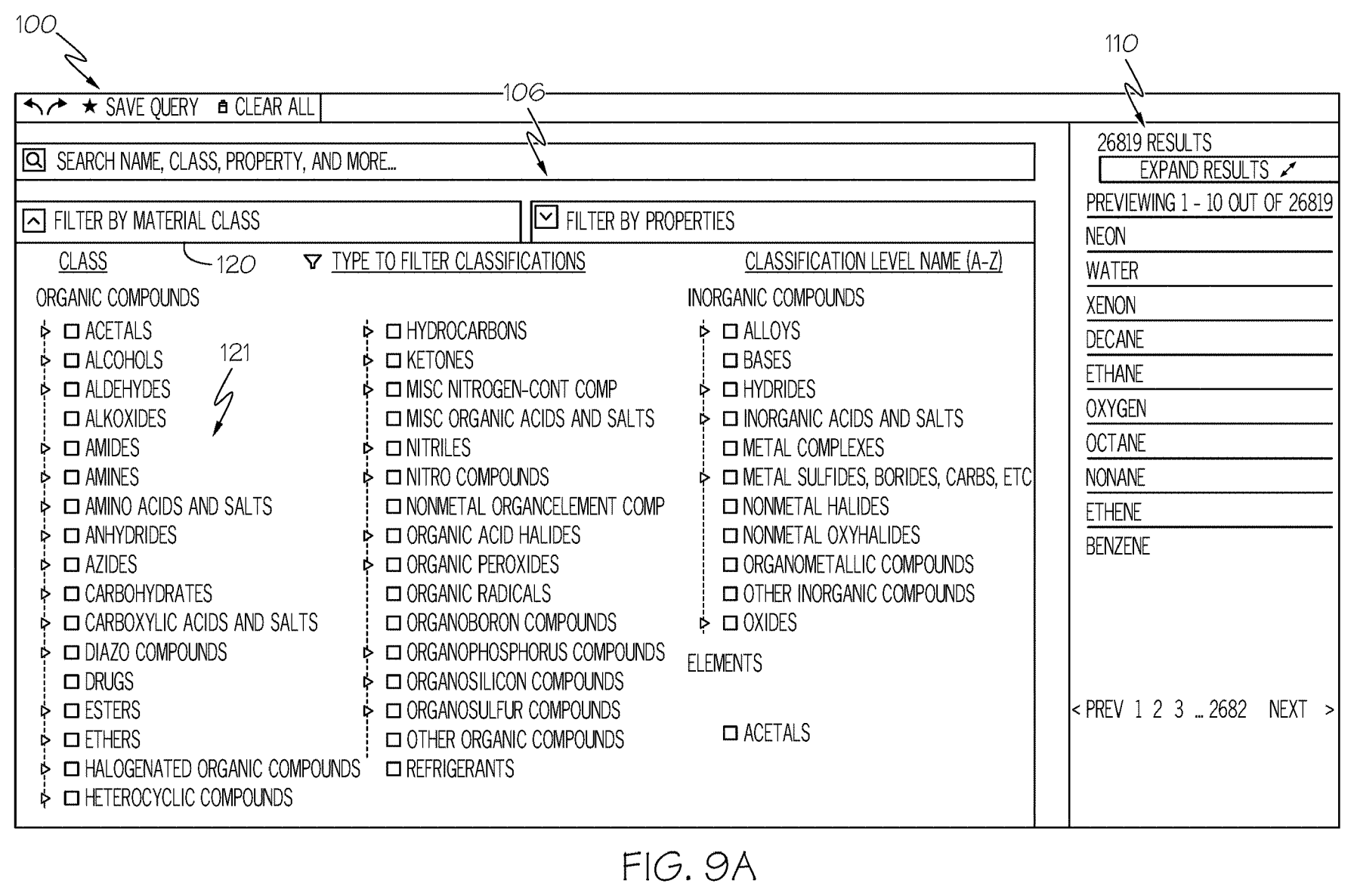

Referring now to FIG. 9A, clicking into or otherwise selecting the class filter window 120 may cause a plurality of chemical material classes 121 to be displayed. In the non-limiting example, the chemical material classes 121 are organized by organic materials, inorganic materials, and elements. However, it should be understood that other organization arrangements are also possible. The user may use the class filter window 120 to browse different classes of chemical materials.

Figure 9B:
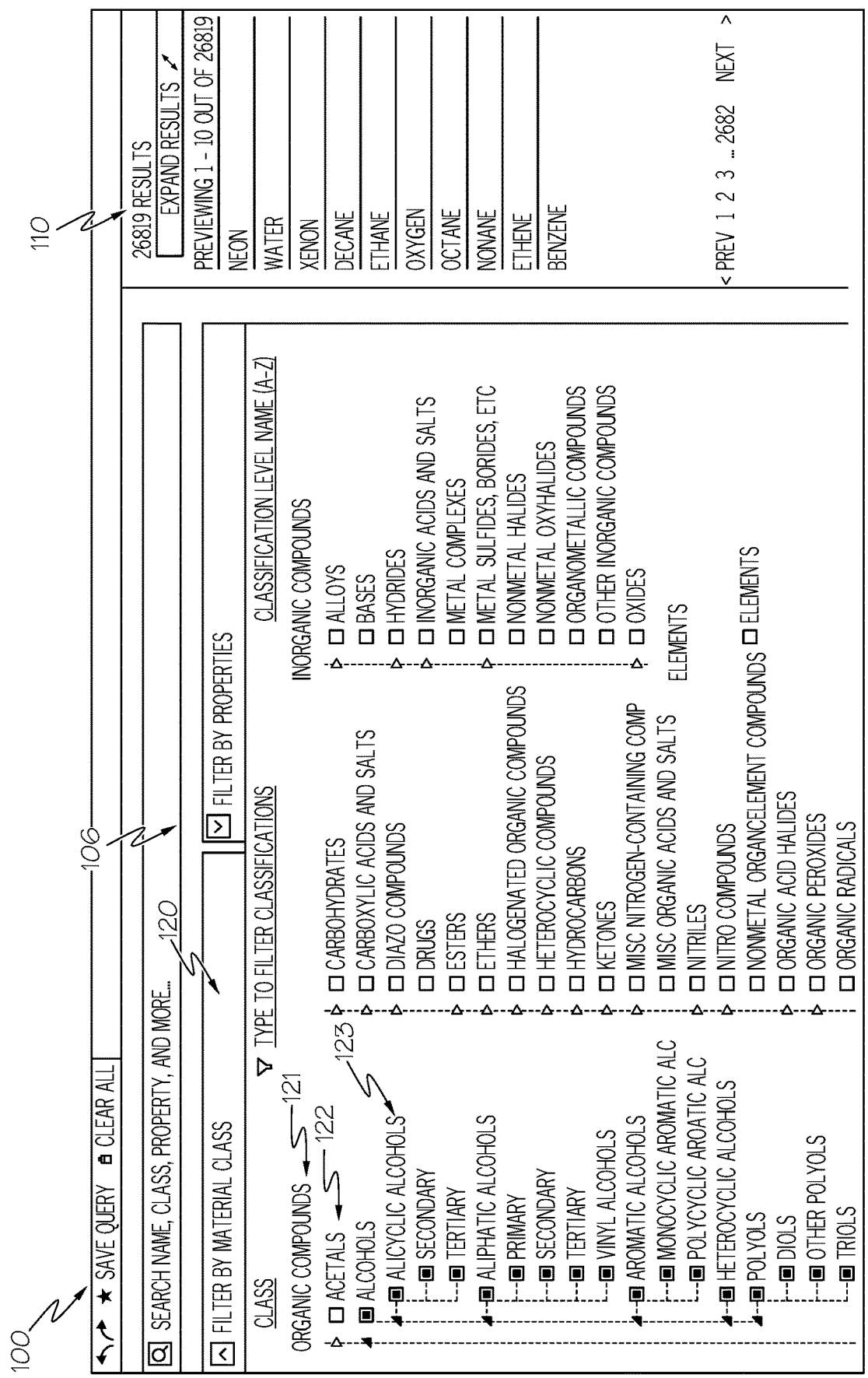

FIG. 9B graphically illustrates selection of alcohols, which, in the example embodiment, causes expansion and a hierarchical display of sub-classes 123 of alcohols 122, such as, without limitation, alicyclic alcohols, aliphatic alcohols, aromatic alcohols, and the like. It should be understood that embodiments are not limited to the format of the hierarchical display illustrated in FIG. 9B, and that other formats are also possible. The user may select and de-select the various sub-classes of alcohols (or other chemical materials) as desired. It is noted that with the selection of alcohols, the number of materials in the results window 110 is reduced such that only alcohols are included in the non-limiting example. The user may scroll through the results window 110 to browse and discover chemical materials of interest that satisfy the class/sub-class filter criteria.

As noted above, the graphical user interface 100 also provides the user with the ability to search for desired chemical materials by name, class, groups, and the like.

Figure 10:
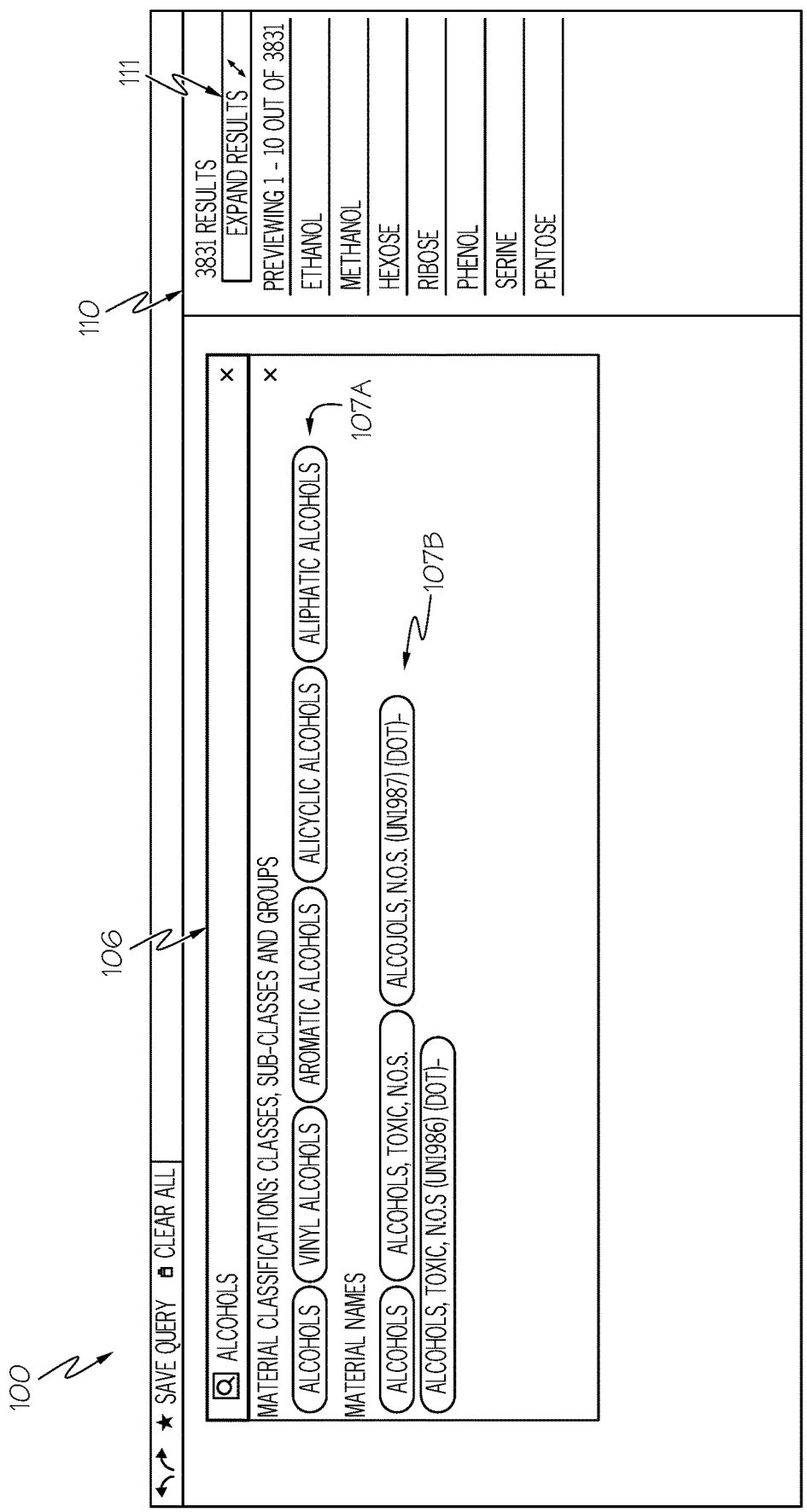
FIG. 10 depicts an example method of searching for chemical materials using a search field of the graphical user interface depicted in FIG. 8 according to one or more embodiments described and illustrated herein.

Referring to FIG. 10, a user has typed the word "alcohols" in the search field 106, which causes sub-classes of alcohols to be displayed in display region 107A, and various material names for alcohol in display region 107B. Selection of a sub-class of alcohols in display region 107A may cause the selected sub-class of alcohol to be added to the search query, as well as cause the hierarchical display of sub-classes 123 of alcohols to be displayed, along with a graphical indication regarding the selection of the selected sub-class of alcohols as selected in display region 107A. Additionally, selection of a material name in display region 107B may similarly cause the selected material name to be added to the query and be displayed in the hierarchical display of sub-classes 123.

In some embodiments, the user may also type in more than one category of search term into the search field 106 to more narrowly search for information. System may be configured to receive two or more categories of information, and individually search the normalized data for the different categories of information to find and display relevant information. For example, the user may type a name of a chemical material as well as a property. The system may search for the name of the chemical material, and then the property for that chemical property. In a non-limiting example, the user may type the term "benzene" and "density" into the search field 106. The system recognizes "benzene" as a name of a chemical material, and "density" as a property. The graphical user interface 100 may then display information relating to the density of benzene.

Figure 11:
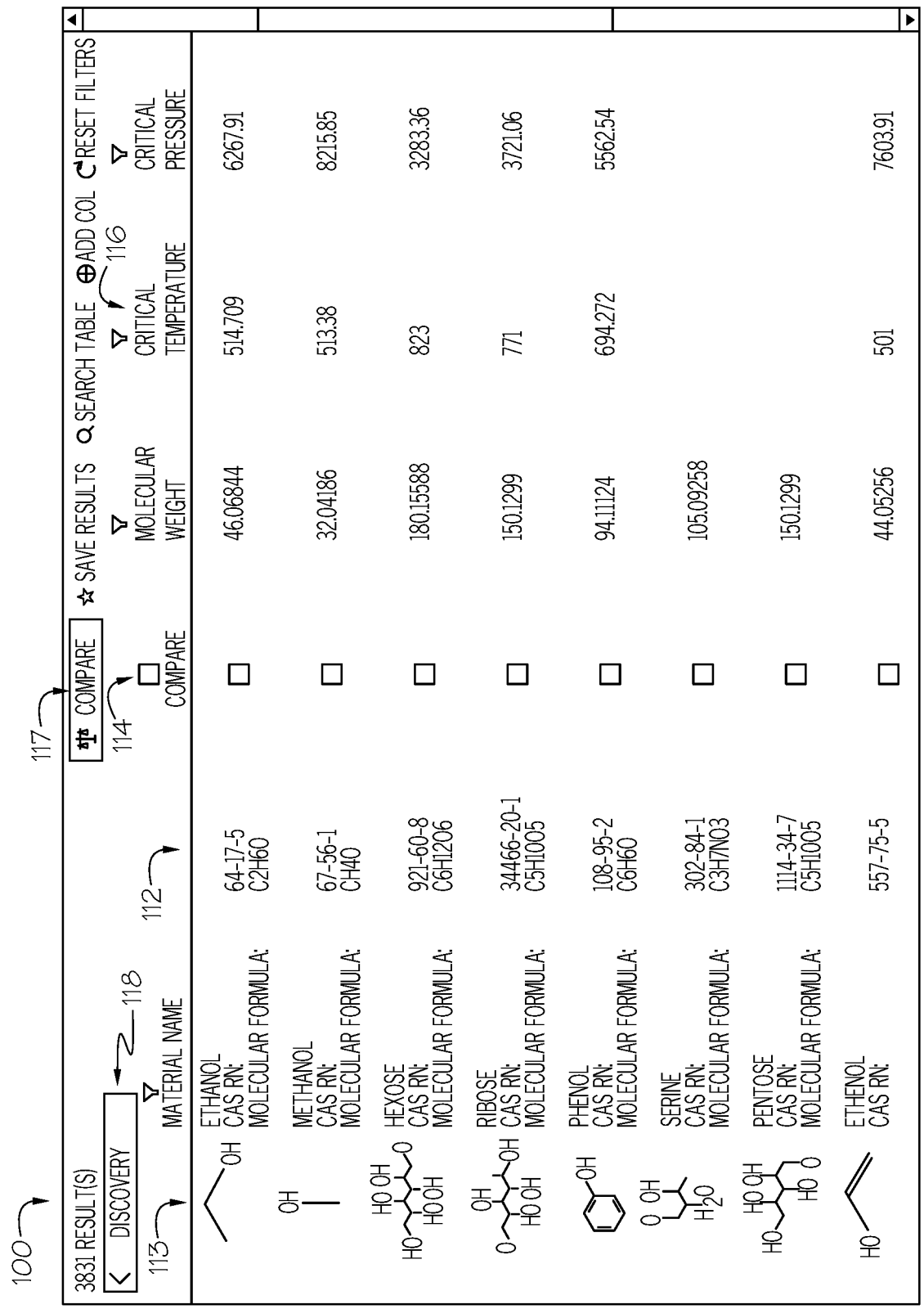
FIG. 11 depicts an example expanded results window of the graphical user interface depicted in FIG. 8 according to one or more embodiments described and illustrated herein.

The results within the results window 110 may be expanded by selection of an expand results button 111. FIG. 11 graphically illustrates an expanded results window 112 for the selection of alcohol. The expanded results window 112 includes rows of chemical materials, and columns of properties. As non-limiting examples, for each chemical material, the chemical structure 113 may be depicted. The columns 116 may also include information such as the material name, the chemical formula, the CAS number, the molecular weight, and the like. The graphical user interface 100 may also include the ability to add and remove various properties from the columns 116. The user may also search for information within the table.

Figure 17A:
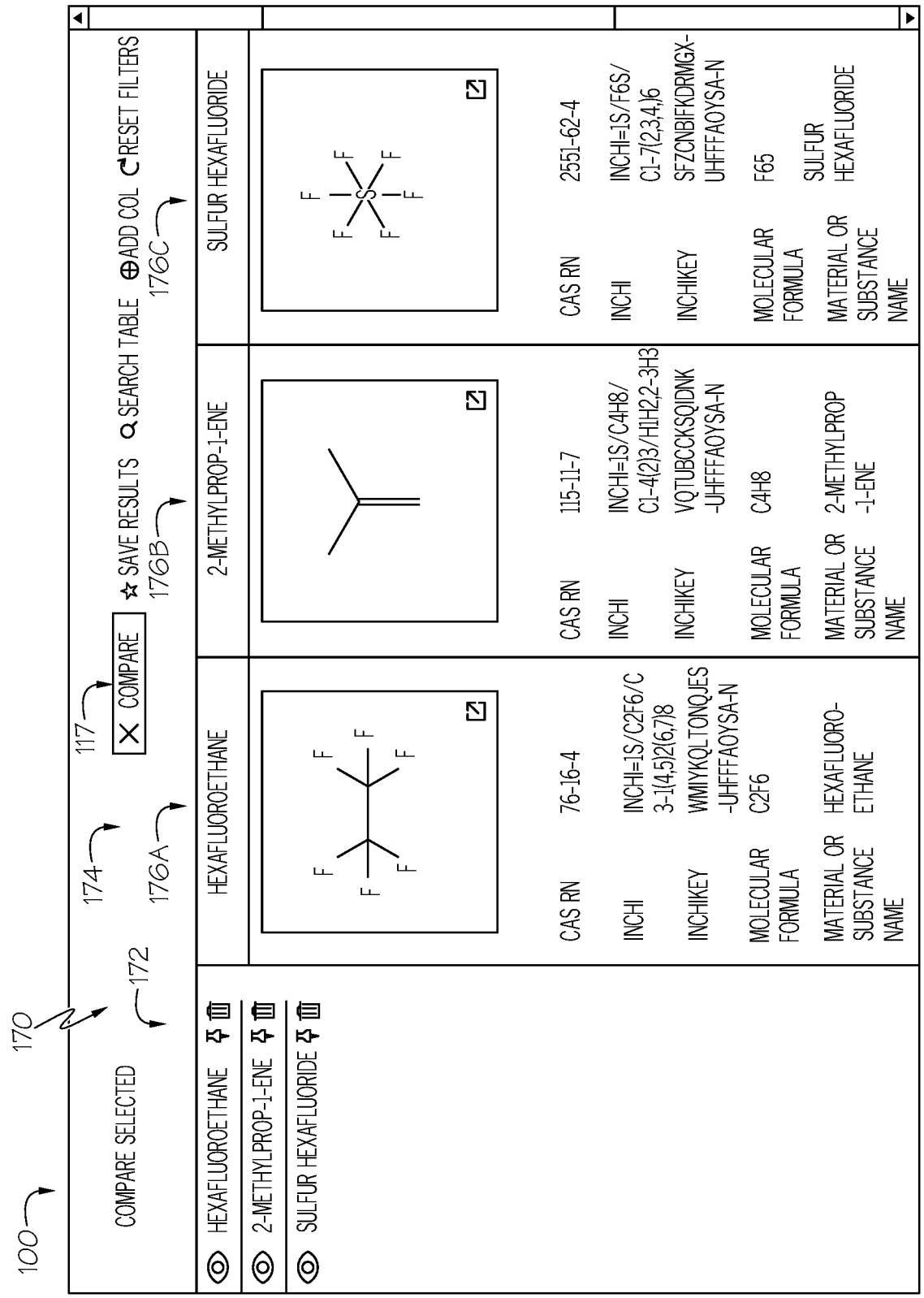

As described in more detail below and illustrated in FIGS. 17A-17C, the graphical user interface 100 provides the ability to compare properties of different chemical materials. For each chemical material, there is a compare radio button 114 (or other graphical feature) that a user may select if he or she desires to compare the selected chemical material to one or more other chemical materials. After selection of two or more chemical materials, the user may select a compare button 117 (or other graphical feature) that causes the graphical user interface 100 to illustrate a comparison of properties and aspects of the selected chemical materials (see FIGS. 17A-17C).

Selection of an individual chemical material causes the graphical user interface to display additional information regarding the selected chemical material according to the normalized data described above. Upon selection of the selected chemical material, the normalized data is accessed in the data structure and populated in a chemical material property display window 150. A non-limiting example of a chemical material property display window 150 is graphically depicted in FIGS. 12A-12E. In the example embodiment, the user may scroll through a large window as represented by FIGS. 12A-12E, where FIG. 12A represents the "top" of the window 150 and FIG. 12E represented the "bottom" of the window. It should be understood that embodiments are not limited to the chemical material property display window 150 depicted in FIGS. 12A-12E.

Referring to FIG. 12A, the chemical material property display window 150 may graphically depict a chemical structure, and basic information regarding the selected chemical material in display region 152, such as, without limitation, CAS number, material or substance name, molecular formula, simplified molecular-input line-entry system (SMILES), international chemical identifier (inChi), hashed inChi (InChiKey), a link to download the Molfile of the chemical material, and various synonyms. Also shown in FIG. 12A, the taxonomy information of the selected chemical material is displayed.

Referring to FIG. 12B, the chemical material property display window 150 further displays single-values properties such as, without limitation, boiling point, critical pressure, critical temperature, critical density, triple point temperature, enthalpy of fusion, and Molecular Weight. In some embodiments, the chemical material property display window 150 may display parameters for each of the single-value properties, such as the original source from which the property is taken, the phase of the chemical material for the particular single-value property, the value of the single-value property, an uncertainty of the value, experimental data details, and conditions at which the values were derived. If experimental data details are available, an icon 154 may be displayed.

Referring to FIG. 12F, selection of an icon 154 for a particular single-value property may cause an experimental data window 155 to be displayed. The experimental data window 155 displays information regarding past experiments of the particular single-value property for the selected chemical material. Information such as the literature source, the year, the value, and the uncertainty of the value may be displayed for a plurality of experiments, if available.

Referring to FIG. 12C-12E, the chemical material property display window 150 may also display multi-valued properties of various property categories. The property values include, but are not limited to:
phase transition and critical properties (e.g., boiling point, melting pressure and vapor pressure);
thermodynamic properties (e.g., enthalpy, enthalpy of sublimation, enthalpy of formation, entropy, heat capacity at constant pressure, heat capacity at saturation pressure, pressure coefficient of enthalpy and sublimation pressure);
thermophysical properties (e.g., adiabatic compressibility, compressibility factor, Joule-Thomson coefficient, second virial coefficient, third virial coefficient, and the speed of sound);
rheological properties (e.g., dynamic viscosity);
surface properties (e.g., surface tension);
optical properties (e.g., refractive index); and
transport properties (e.g., thermal conductivity).
It should be understood that other properties may be provided, such as, without limitation, electrical properties.

Figure 13A:
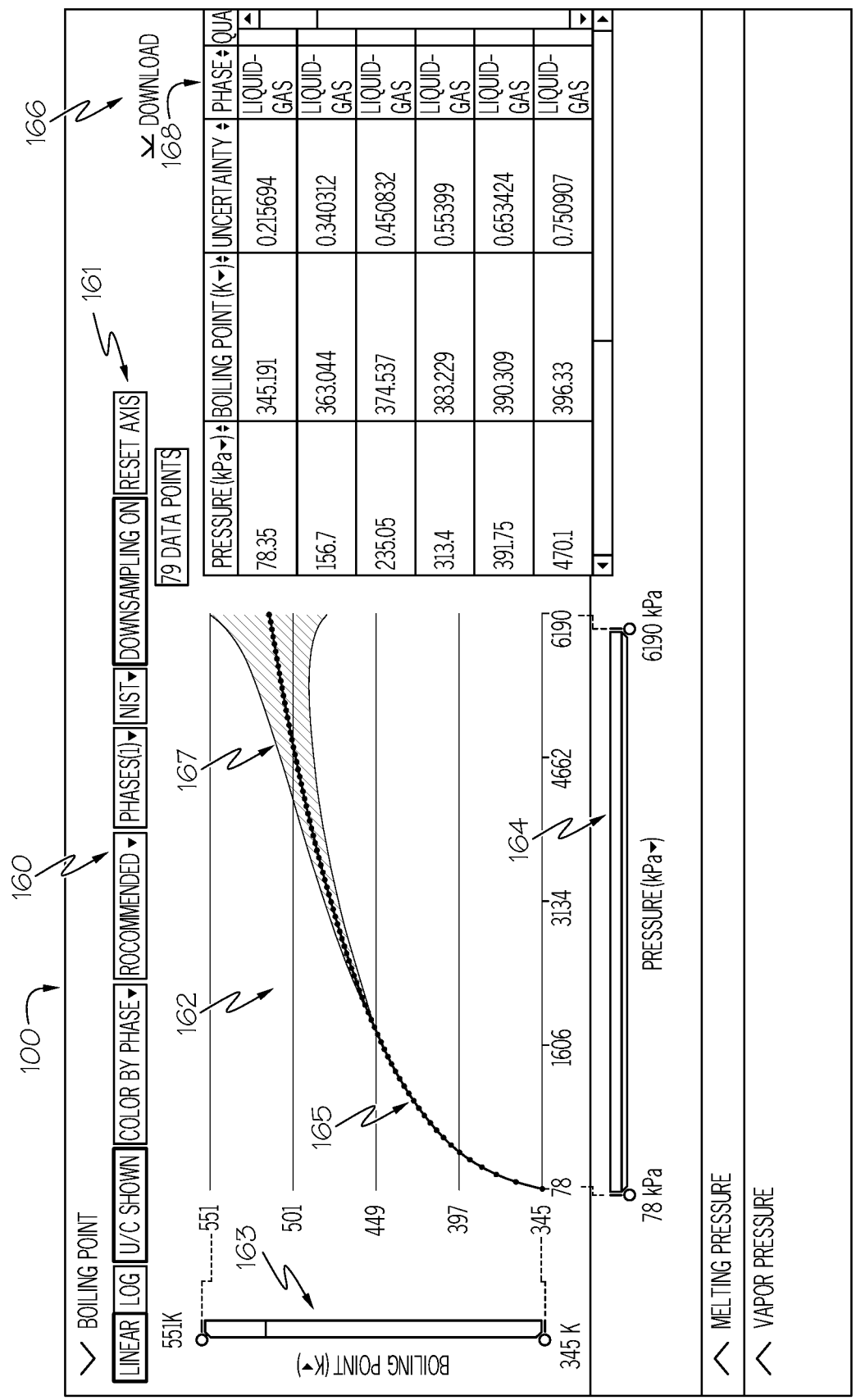
FIGS. 13A and 13B depict example multi-valued property display windows of the graphical user interface depicted in FIG. 8 according to one or more embodiments described and illustrated herein.

Selection of any one of the multi-valued properties displayed in the chemical material property display window 150 may cause additional information regarding the selected multi-valued property to be displayed. FIG. 13A graphically depicts an example multi-valued property display window 160 for the boiling point of ethanol as a non-limiting example. Generally, the multi-valued property display window 160 displays a graph 162 having pressure for an x-axis (i.e., a horizontal axis) and boiling point for the y-axis (i.e., vertical axis). The curve 165 is obtained from a plurality of data points within the normalized data for the boiling point of ethanol. A first slideable scale 163 allows a user to manipulate the values on the y-axis (e.g., boiling point), while a second slideable scale 164 allows the user to manipulate the values on the x-axis (e.g., pressure). In this manner, the user may zoom into or out of the curve 165 to view the desired data points. It should be understood that the values on the x-axis and y-axis may be changed by devices other than slideable scales, such as by receiving values in a text field, for example.

The multi-valued property display window 160 further includes controls 161 to control how the data is displayed in the graph 162. The controls 161 allow a user to select a linear scale or a log scale, to toggle the uncertainty 167 on and off within the graph 162, to color the data points within the curve 165 by phase, temperature or pressure as applicable, to select the quality of the data points (e.g., recommended), to select the phase to display (e.g., liquid-gas), to select the source (e.g., NIST), to turn downsampling on or off, and to reset the x- and y-axes as adjusted by the first and second slideable scales.

In some embodiments, information regarding each data point shown in the graph 162 may be displayed in a table 168. It should be understood that the information may depend on the selected multi-value property. For the boiling point of ethanol, the information in the table includes the pressure value, the boiling point value, the uncertainty value, the phase, the quality of the data, the source of the data, and the like. In some embodiments, selection of a multi-value property in the table 168 (e.g., hovering a mouse pointer) causes the corresponding data point in the curve 165 to be highlighted along with a pop-up window that includes at least some data of the selected row of data in the table 168. Additionally, selecting a data point in the curve 165 (e.g., hovering a mouse pointer) may cause the pop-up window including the data of the selected data point from the table 168 to be displayed. In some embodiments, the graph 162 and table 168 may be downloaded, such as by selection of a download icon 166. As a non-limiting example, the data points may be downloaded as a spreadsheet file.

Figure 13B:
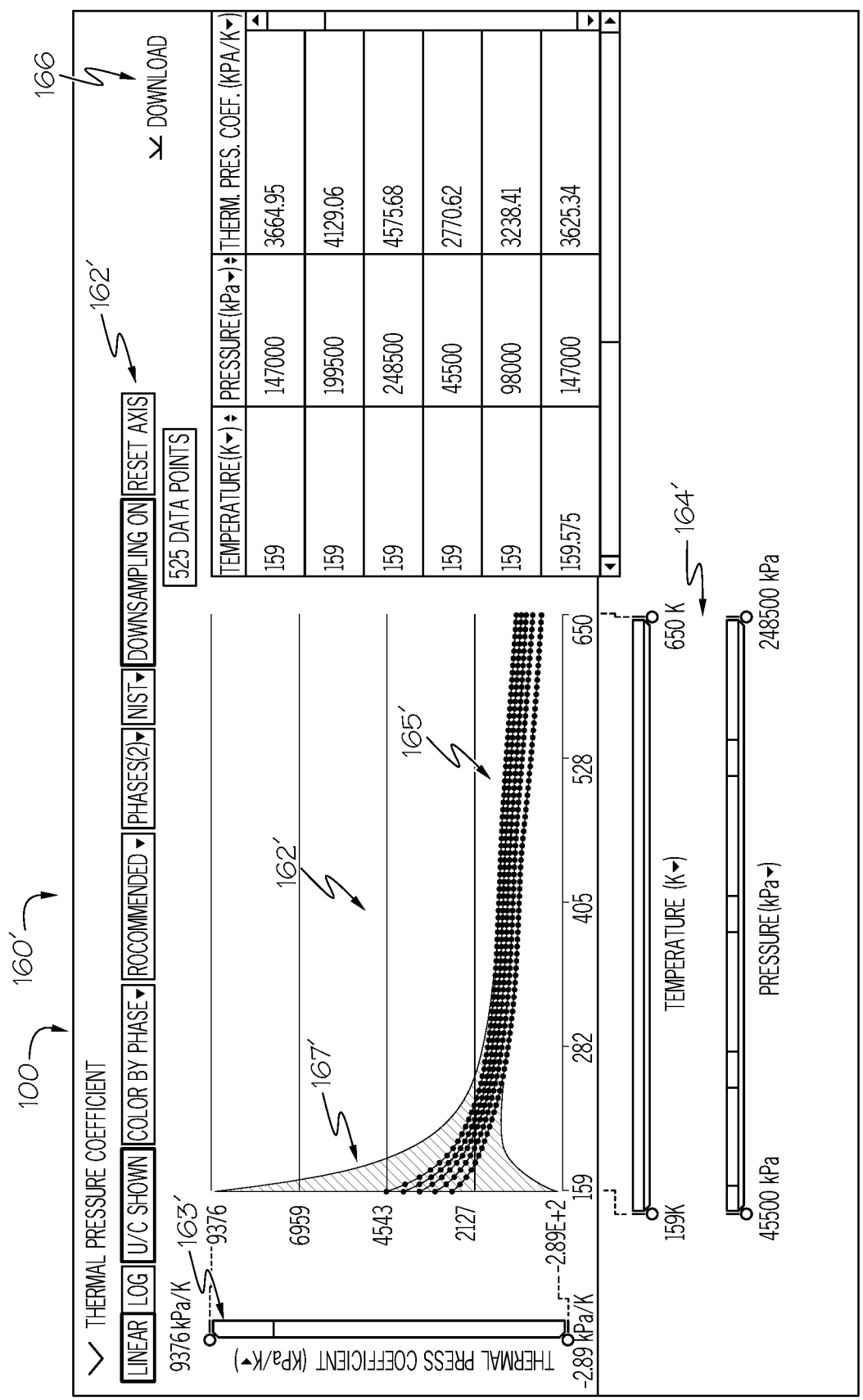

FIG. 13B graphically depicts another example multi-value property display 160', which is the result of a selection of the thermal pressure coefficient. The multi-value property display 160' includes a graph 162' having a plurality of curves 165', with each curve 165' corresponding to a particular pressure. The x-axis is temperature, and the y-axis is the thermal pressure coefficient. A first slideable scale 163' may be manipulated to adjust a range of thermal pressure coefficients on the y-axis, a second slideable scale 164A' may be manipulated to adjust a range of the temperatures on the x-axis, and a third slideable scale 164B' may be manipulated to adjust a range of pressures. The table 168' includes information regarding data points such as, without limitation, temperature, pressure, thermal pressure coefficient, uncertainty, phase, quality of the data, source of the data, and the set label.

In some embodiments, the user may select a range of values on the x-axis and/or the y-axis to zoom into the particular range(s) and display only those chemical compounds within the selected range(s) of values. In some embodiments, the graphs described herein may be configured as a scatter plot, wherein points within the scatter plot are chemical materials having particular properties (e.g., properties as defined by the x- and/or y-axis). The user may draw a shape to select (i.e., "lasso") a plurality of points within the scatter plot to obtain more information regarding the selected chemical materials of the selected plurality of points.

Figure 14:
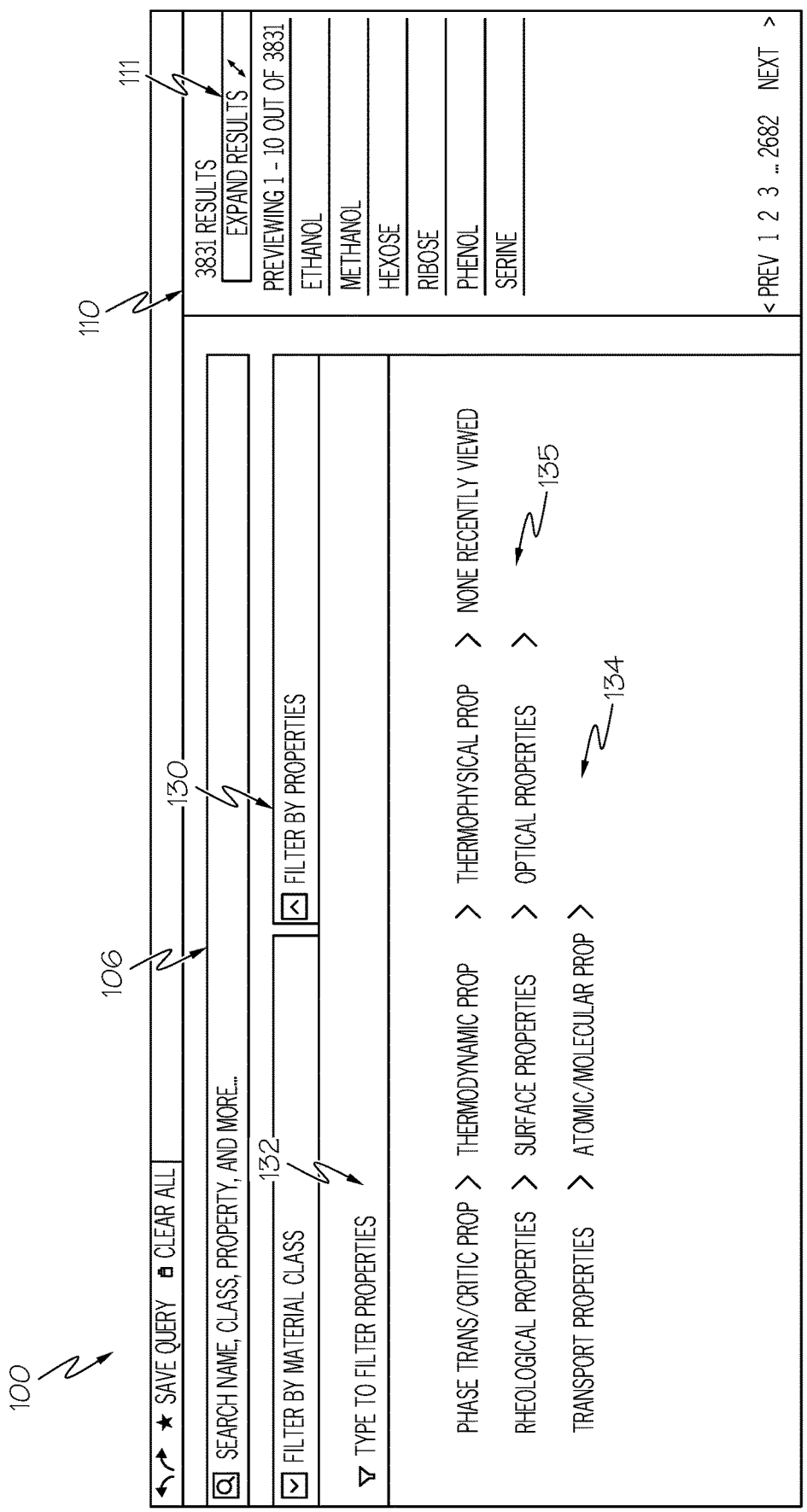
FIG. 14 depicts an example properties filter window of the graphical user interface depicted in FIG. 8 according to one or more embodiments described and illustrated herein.

Referring now to FIG. 14, the graphical user interface 100 provides a properties filter window 130 that enables a user to search individual property values to uncover desired chemical materials that satisfy those individual property values. In the non-limiting graphical user interface 100 shown in FIG. 14, a plurality of property categories 134 are listed in a properties display region 132. The property categories include, but are not limited to, atomic and molecular properties, optical properties, phase transition and critical properties, rheological properties, surface properties, thermal dynamic properties, thermophysical properties, and transport properties. Other property categories include, but are not limited to, electrical properties, hazard properties, material identifying information, and solution properties. The properties filter window 130 may also have a recently viewed property categories display region 135, wherein recently viewed property categories may be listed.

Figure 15A:
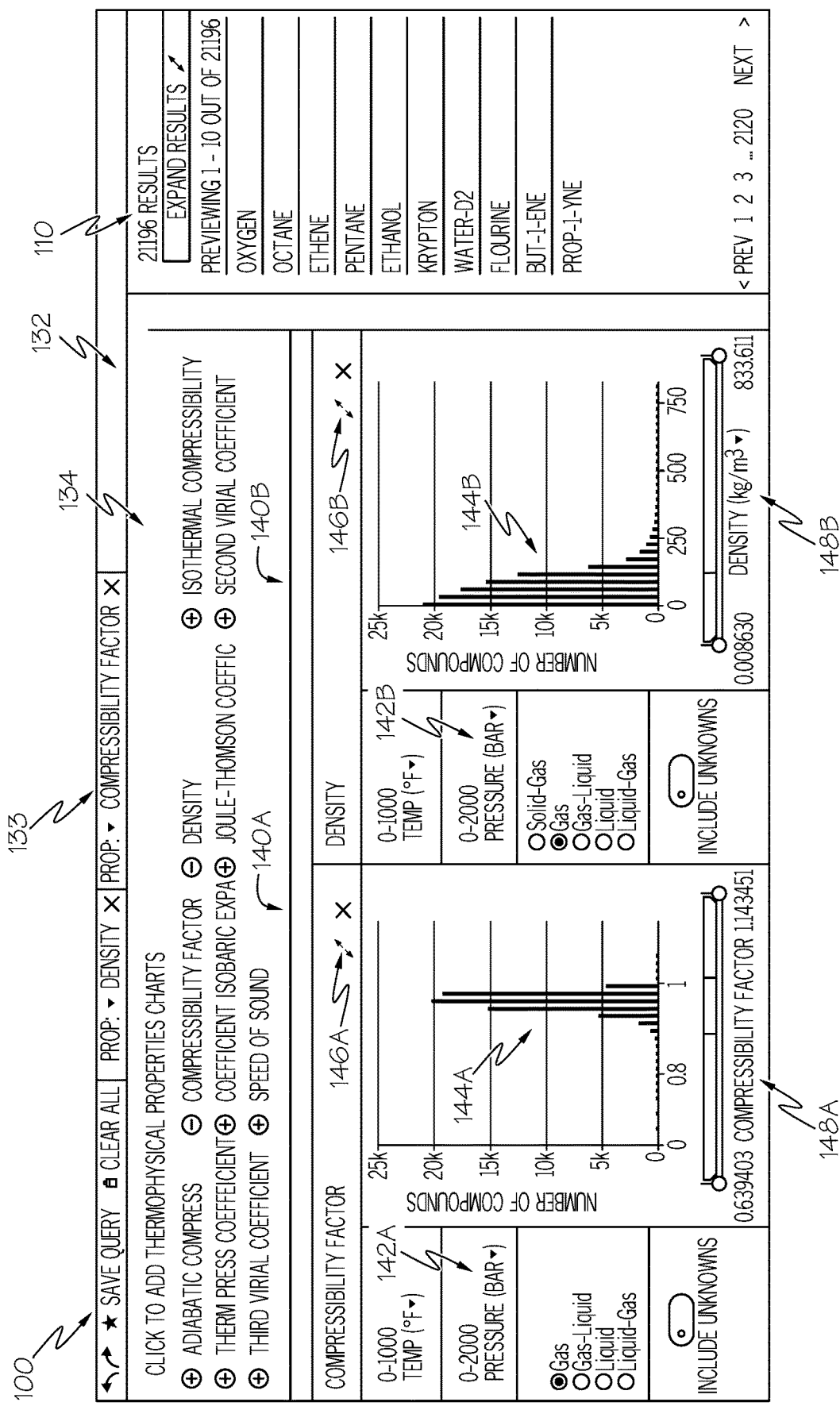
FIGS. 15A and 15B depict example multi-property display windows of the graphical user interface depicted in FIG. 8 for two chemical properties according to one or more embodiments described and illustrated herein.

Selection of an individual property category causes the properties display region 132 to display one or more properties within the selected individual property category. Referring to FIG. 15A as a non-limiting example, selection of the thermophysical property category causes the following non-limiting thermophysical property categories to be listed: adiabatic compressibility, thermal pressure coefficient, third virial coefficient, compressibility factor, coefficient of isobaric expansion, speed of sound, density, Joule-Thomson coefficient, isothermal compressibility, and second virial coefficient. Selection of a thermophysical property causes a property display window to be displayed.

In the non-limiting example of FIG. 15A, selection of the compressibility factor causes a compressibility factor display window 140A to be displayed. The compressibility factor display window 140A includes a first graph 144A, wherein the x-axis (i.e., the horizontal axis) is the compressibility factor and the y-axis is the number of materials. In the illustrated example, the first graph 144A is a bar graph, wherein each bar represents a total number of materials for a compressibility factor value or range of values. It should be understood that other graph types may be utilized. A control region 142A provides controls for values, such as temperature, pressure and phase. An expand/collapse icon 146A causes the compressibility factor display window 140A to be displayed in an expanded view or a collapsed view. It is noted that FIG. 15A shows the compressibility factor display window 140A in a collapsed view to enable a side-by-side comparison to a density display window 140B.

Figure 15B:
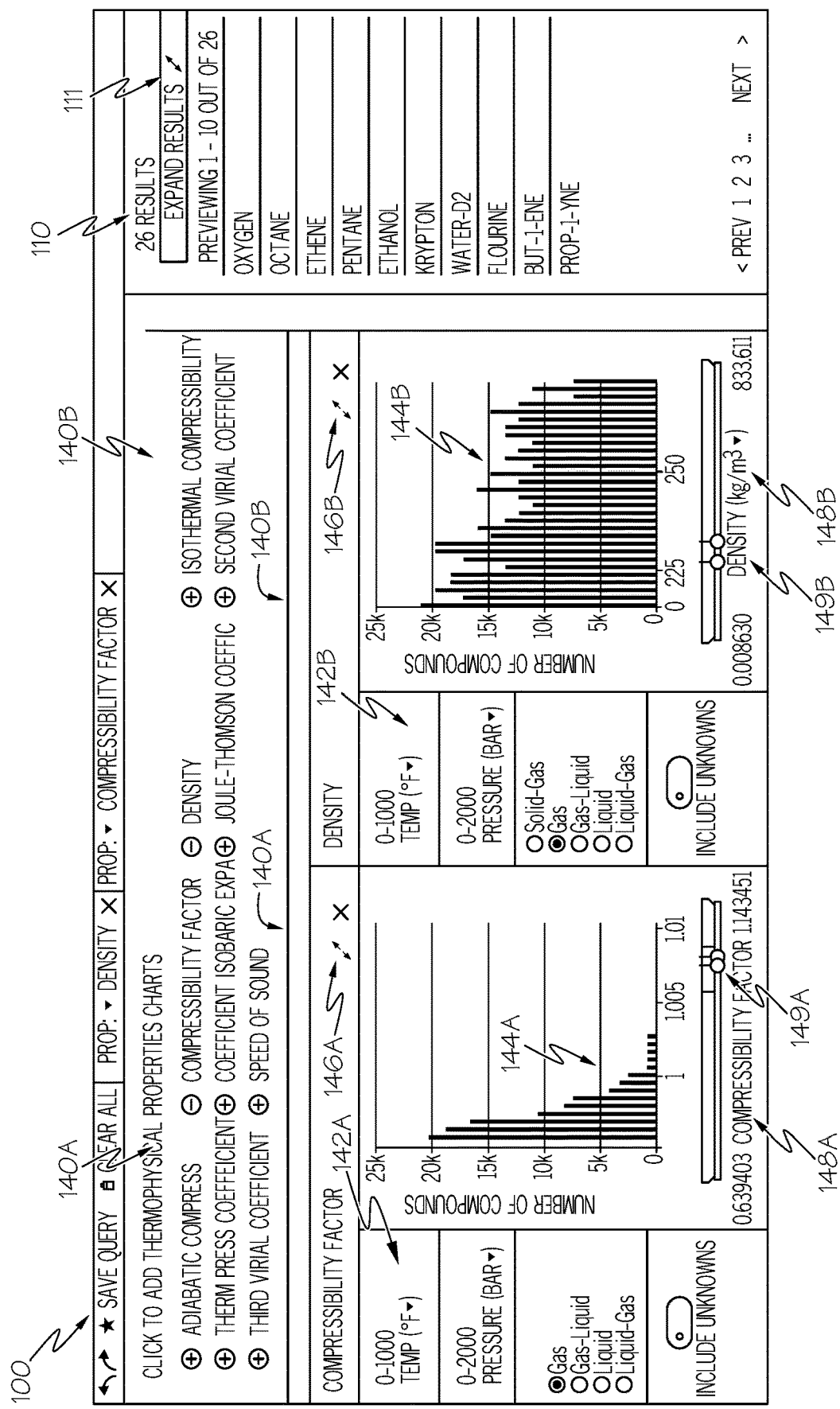

Similarly, selection of density causes the density display window 140B to be displayed. A control region 142B provides controls for values, such as temperature, pressure and phase. The density display window 140B includes a second graph 144B where the x-axis is the density and the y-axis is the number of materials. An expand/collapse icon 146B causes the density display window 140B to be displayed in an expanded view or a collapsed view. It is noted that FIG. 15B shows the density display window 140B in a collapsed view to enable a side-by-side comparison to a compressibility factor display window 140A.

The compressibility factor display window 140A also includes a first slideable scale 148A that manipulates the range of values for the compressibility factor. Similarly, the density display window 140B also includes a second slideable scale 148B that manipulates the range of values or density. Thus, the first and second slideable scales 148A, 148B act as query input devices for the compressibility factor and the density factor, respectively. FIG. 15B graphically depicts the manipulation of the first slideable scale 148A to narrow the range 149A of the compressibility factor, and the manipulation of the second slideable scale 148B to narrow the range 149B of the density. The system searches the normalized data for chemical materials that satisfy both the range of values for the compressibility factor as determined by the first slideable scale 148A and the range of values for the density. The first graph 144A and the second graph 144B show reduced numbers of materials in FIG. 15B than from the numbers of materials depicted in FIG. 15A. The narrowing of the values for the compressibility factor and the density factor reduces the total number of possible chemical materials from over twenty thousand to just 26, as shown in the results display window 110. Thus, the graphical user interface 100 greatly reduces the amount of time and effort to narrow down a large number of chemical materials to a small, manageable number of chemical materials meeting design criteria.

In some embodiments, selecting a bar of the graphs causes the graph to narrow the x-axis about the selected bar. In this manner, the user may "zoom into" the curve of the graph.

It should be understood that more than two properties may be selected and searched. It should also be understood that the range of values for the properties may be entered by a method other than a slideable scale, such as by receiving a range of values in a text box, for example. Additionally, referring to FIG. 15A, selection of a property removal button 136 may remove the property from the filter.

Figure 16:
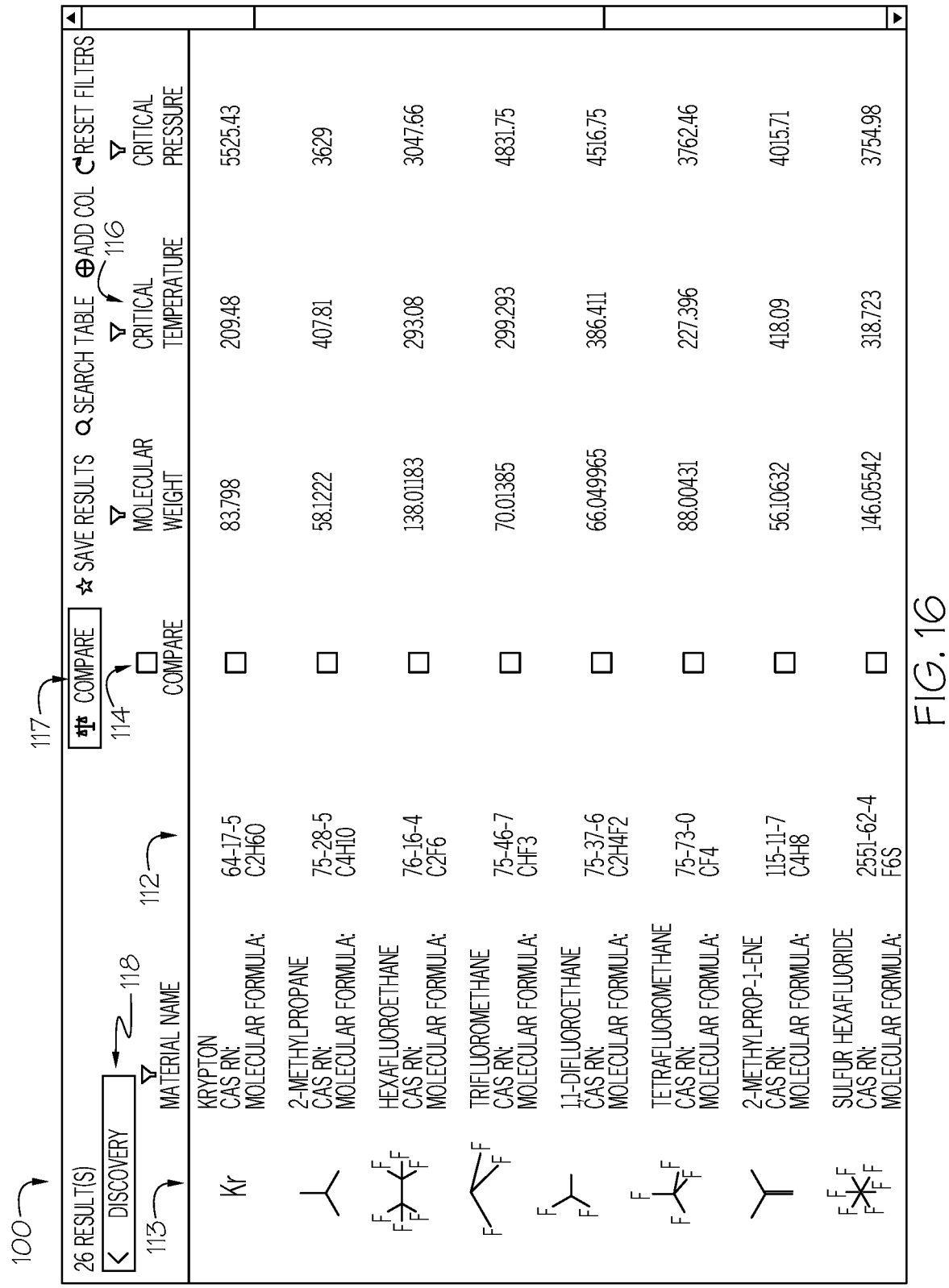
FIG. 16 depict an example expanded results window of the graphical user interface depicted in FIG. 8 according to one or more embodiments described and illustrated herein.

The results window 110 may be expanded to provide additional information regarding the chemical materials that satisfy the search queries for the various properties. For example, selection of the expand results button 111 may cause the results list to be expanded, as shown in FIG. 16. The layout of the expanded results window 112 is similar to the layout depicted in FIG. 11. Two or more chemical materials may be compared. For example, the compare radio buttons 114 may be selected for two or more chemical materials in the expanded results window 112. The selected chemical materials may be compared. For example, selection of a compare button 117 may cause a compare window 170 to be displayed. An example compare window for hexafluoroethane, 2-methylprop-1-ene and sulfur hexafluoride is graphically depicted in FIGS. 17A-17C. FIG. 17A is "top" portion of the compare window 170, while FIG. 17B is a "bottom" portion of the compare window 170.

The information in the compare window 170 may be similar to the information in the chemical material property display window 150 depicted in FIGS. 12A-12E. In a property display region 174, a first property region 176A depicting properties for hexaflouroethane is displayed, a second property region 176B depicting properties for 2-methylprop-1-ene is displayed, and a third property region 176C depicting properties for sulfur hexafluoride is displayed. It should be understood that more or fewer than three chemical materials may be compared. The side-by-side arrangement of the property regions enables a quick comparison of information between the compared chemical materials. A region 172 lists the chemical materials under comparison, and allows for the removal of individual chemical materials.

Like the chemical material property display window 150 depicted in FIGS. 12A-12E, the compare window provides for the selection of single-valued properties and multi-valued properties. Selection of single-valued properties causes the selected single valued properties for each compared chemical material to be displayed. Selection of a multi-valued property causes a graph for each compared chemical material to be displayed.

Figure 18:
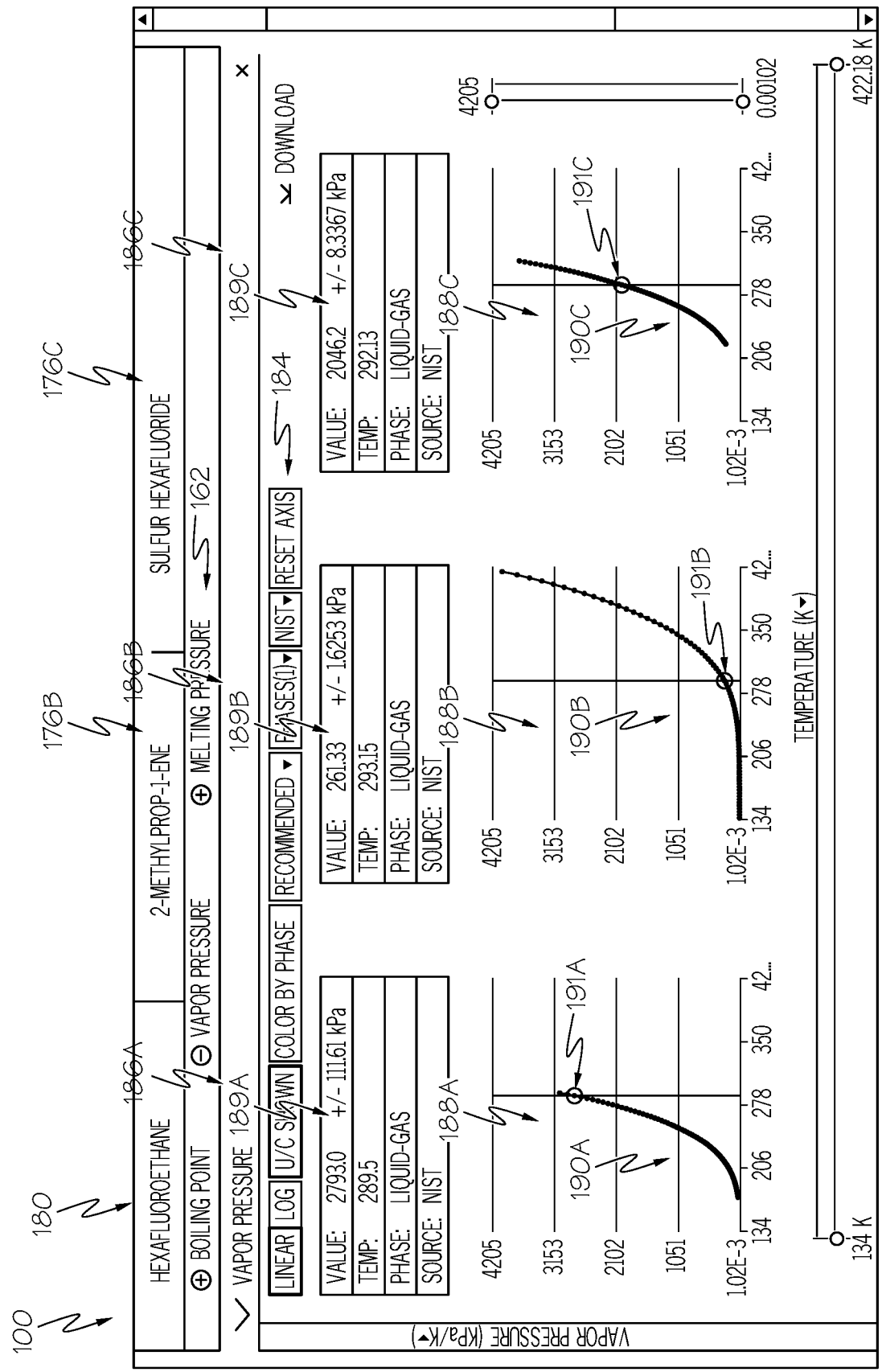
FIG. 18 depicts example graph regions for a selected property of three selected chemical materials of the graphical user interface depicted in FIG. 8 according to one or more embodiments described and illustrated herein.

Referring to FIG. 18, the property "vapor pressure" of the property category "phase transition and critical properties" category is selected. A first graph region 186A for hexafluoroethane is displayed, a second graph region 186B for 2-methylprop-1-ene is displayed, and a third graph region 186C for sulfur hexafluoride is displayed. As described above, the graphical user interface 100 further includes controls 161 to control how the data is displayed in the graphs of the first, second and third graph regions 186A-186C. The first graph region 186A includes a first value region 189A and a first graph 188A depicting a first vapor pressure curve 190A for hexafluoroethane, the second graph region 189B includes a second value region 189B and a second graph 188B depicting a second vapor pressure curve 190B for hexafluoroethane, and the third graph region 186C includes a third value region 189C and a third graph 188C depicting a third vapor pressure curve 190C for sulfur hexafluoride. In each of the example graphs, the x-axis is temperature, and the y-axis is vapor pressure. It should be understood that these values may be different for different properties.

Selection of a data point in any one of the first, second or third vapor pressure curves 190A, 190B, 190C for a particular temperature causes corresponding values for the particular temperature to be depicted in each of the first, second and third value regions 189A, 189B, 189C provided that there is corresponding data for the particular element at the selected temperature. As a non-limiting example, selection of data point 191A in the first vapor pressure curve 190A causes the temperature of the data point (289.50 K) to be displayed, the vapor pressure of the data point (2793.0 kPa) to be displayed, the phase hexafluoroethane (liquid-gas) to be displayed, and the source (NIST) to be displayed. The second value region 189B and the third value region 189C display corresponding values for 2-methylprop-1-ene and sulfur hexafluoride, respectively. Additionally, data point 191B on the second vapor pressure curve 190A for the temperature of data point 191A is highlighted, and data point 191C on the third vapor pressure curve 190A for the temperature of data point 191A is also highlighted.

It is noted that the graphical user interface 100 described above provides for non-hierarchical searching. A user does not need to start with any one particular property and work down a hierarchy to obtain desired chemical materials. Rather, the user may go right to the desired property or properties to search for chemical materials.

A user designing an article, such as, without limitation, an electronic device, a drug, a structural component, clothing, space and defense equipment, and the like, may desire to determine one or more chemical materials having one or more desired properties, such as, without limitation, compressibility factor and density, for example. The user may access the graphical user interface 100 to select the one or more desired properties to generate one or more graphs of the one or more desired properties. The user may then manipulate the one or more graphs by changing values of the one or more desired properties to meet his or her needs. Chemical materials satisfying all of the values of the desired properties are displayed to the user for his or her selection. The article may be manufactured or otherwise fabricated by incorporating the one or more selected chemical materials into the article.

It should be understood that embodiments are not limited to the graphical user interface 100 described above and illustrated in FIGS. 8-18, and that it is provided for illustrative purposes. Other graphical user interfaces and configurations may be utilized.

It should now be understood that the systems and methods described herein provide for the importation of electronic data from a variety of different sources. The electronic data among the various different sources has different formatting. The electronic data is converted into normalized data so that the normalized data may be searched by a graphical user interface. For example, the source data may include source properties for a plurality of chemical materials that is formatted in according to a source format. The systems and methods described herein convert the plurality of source properties into a plurality of normalized properties. The electronic data is converted to normalized electronic data in a normalized format. The data is stored in a nested model data structure such that the plurality of normalized properties may be individually searched using a graphical user interface. The graphical user interface allows the user to visually search multiple properties simultaneously to find desirable chemical materials according to his or her needs. The normalization of the data and arrangement of data in the nested model data structure improves the functioning of the computer because the data is formatted in a consistent manner, and searching of one property affects the searching of remaining properties. For example, values inputted for a first property may eliminate the need to search a second property because the values for the first property are mutually exclusive with respect to the second property. Thus, the computer does not need to search the second material, thereby saving processing time.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

The invention claimed is:

1. A method of fabricating an article, the method comprising:
 in a first graphical user interface displayed on an electronic display, selecting a first property corresponding to materials, wherein:
  selection of the first property causes a first graph to be displayed such that values of the first property is on a first axis of the first graph and a first number of materials is on a second axis of the first graph; and
  the first graph comprises a plurality of bars across the first axis such that each bar represents a total number of materials for a value or a range of values of the first property;
 entering a first range of values for the first property, wherein:
  entering the first range of values for the first property causes the first axis of the first graph to be limited to the first range of values; and
  entering the first range of values for the first property causes the first graphical user interface to list, via a results window, only materials of the first number of materials that satisfy the first range of values for the first property;
 selecting, via a first user interface element, a first material from the list for comparison;
 selecting, via a second user interface element, a second material from the list for comparison;
 selecting, via a second graphical user interface, a property associated with the first material and the second material for comparison;
 selecting, in the second graphical user interface, a first data point on a first comparison graph that corresponds to a value of the property selected for comparison, wherein:
  the first comparison graph is associated with the first material and a second comparison graph is associated with the second material, the first comparison graph and the second comparison graph including an axis depicting values associated with the property selected for comparison; and
  selecting the first data point causes a second data point on the second comparison graph to be highlighted;
 determining a material that satisfies the first range of values for the first property from the list; and
 incorporating the material into the article.

2. The method of claim 1, further comprising:
 selecting a second property corresponding to materials, wherein:
  selection of the second property causes a second graph to be displayed such that values of the second property is on a first axis of the second graph and a second number of materials is on a second axis of the second graph; and
  the second graph comprises a plurality of bars across the first axis such that each bar represents a total number of materials for a value or a range of values of the second property;
 entering a second range of values for the second property, wherein:
  entering the second range of values for the second property causes the first axis of the second graph to be limited to the second range of values;
  entering the second range of values for the second property causes the first graphical user interface to list, via the results window, only materials of the first number of materials and the second number of materials that satisfy the first range of values for the first property and the second range of values for the second property respectively; and
  the determined material satisfies the first range of values for the first property and the second range of values for the second property.

3. The method of claim 1, further comprising:
 generating, in the second graphical user interface, a first value region corresponding to the first comparison graph and a second value region corresponding to the second comparison graph, and wherein selecting the first data point on the first comparison graph causes values corresponding to the selected first data point to be depicted in the first value region and values corresponding to the highlighted second data point to be depicted in the second value region.

4. The method of claim 1, wherein generating the first comparison graph and the second comparison graph includes positioning the first comparison graph adjacent to the second comparison graph, within the second graphical user interface, for side-by-side comparison.

5. The method of claim 1, wherein the results window displays a name for each of the materials in the list.

6. The method of claim 1, wherein entering the first range of values for the first property includes manipulating a first slideable scale, associated with the first axis of the first graph, to reflect the first range of values on the first axis.

7. The method of claim 2, further comprising:
generating, in the second graphical user interface, a first value region corresponding to the first comparison graph and a second value region corresponding to the second comparison graph, and wherein selecting the first data point on the first comparison graph causes values corresponding to the selected first data point to be depicted in the first value region and values corresponding to the highlighted second data point to be depicted in the second value region.

8. The method of claim 2, wherein generating the first comparison graph and the second comparison graph includes positioning the first comparison graph adjacent to the second comparison graph, within the second graphical user interface, for side-by-side comparison.

9. The method of claim 2, wherein the results window displays a name for each of the materials in the list.

10. The method of claim 2, wherein:
entering the first range of values for the first property includes manipulating a first slideable scale, associated with the first axis of the first graph, to reflect the first range of values on the first axis; and
entering the second range of values for the second property includes manipulating a second slideable scale, associated with the first axis of the second graph, to reflect the second range of values on the first axis.

11. The method of claim 2, wherein selection of the second property causes the second graph to be displayed adjacent to the first graph, within the first graphical user interface, for side-by-side comparison.

12. The method of claim 6, wherein the first range of values is a narrowed range of values such that the list reflects a reduced number of the first number of materials.

13. The method of claim 10, wherein at least one of:
the first range of values is a narrowed range of values such that the list reflects a reduced number of the first number of materials; or
the second range of values is a narrowed range of values such that the list reflects a reduced number of the second number of materials.

14. A method of fabricating an article, the method comprising:
in a first graphical user interface displayed on an electronic display, selecting more than one property corresponding to materials, wherein:
selection of the more than one property causes more than one respective graph to be displayed such that values corresponding to each respective property are on a first axis of each respective graph and a respective number of materials is on a second axis of each respective graph; and
the more than one respective graph comprises a plurality of bars across the first axis such that each bar represents a total number of materials for a value or a range of values of the first property;
entering a respective range of values for each of the more than one property, wherein:
entering the respective range of values for each of the more than one property causes the first axis of each respective graph to be limited to its corresponding respective range of values; and
entering the respective range of values for each of the more than one property causes the first graphical user interface to list, via a results window, only materials of the respective number of materials that satisfy each respective range of values for the more than one property;
selecting, via a first user interface element, a first material from the list for comparison;
selecting, via a second user interface element, a second material from the list for comparison;
selecting, via a second graphical user interface, a property associated with the first material and the second material for comparison;
selecting, in the second graphical user interface, a first data point on a first comparison graph that corresponds to a value of the property selected for comparison, wherein:
the first comparison graph is associated with the first material and a second comparison graph is associated with the second material, the first comparison graph and the second comparison graph including an axis depicting values associated with the property selected for comparison; and
selecting the first data point causes a second data point on the second comparison graph to be highlighted;
selecting a material that satisfies each respective range of values for the more than one property from the list; and
fabricating an article including the selected material.

15. The method of claim 14, further comprising:
generating, in the second graphical user interface, a respective value region corresponding to each respective comparison graph, and wherein selecting the first data point on the one generated comparison graph causes values corresponding to the selected first data point to be depicted in the respective value region corresponding to the one generated comparison graph and values corresponding to each highlighted second data point to be depicted in the respective value region corresponding to each of the other generated comparison graph.

16. The method of claim 14, wherein generating the more than one respective comparison graph includes positioning the more than one respective comparison graph adjacent to one another, within the second graphical user interface, for side-by-side comparison.

17. The method of claim 14, wherein selection of the more than one property causes the more than one respective graph to be displayed adjacent to one another, within the first graphical user interface, for side-by-side comparison.

* * * * *